US011418394B1

(12) United States Patent
Wells et al.

(10) Patent No.: US 11,418,394 B1
(45) Date of Patent: Aug. 16, 2022

(54) USING A DOMAIN-SPECIFIC LANGUAGE TO DESCRIBE NETWORK-LEVEL BEHAVIOR

(71) Applicant: Cisco Technology, Inc., San Jose, CA (US)

(72) Inventors: Ian James Wells, San Jose, CA (US); Kyle Andrew Donald Mestery, Woodbury, MN (US); Grzegorz Boguslaw Duraj, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/469,670

(22) Filed: Sep. 8, 2021

(51) Int. Cl.
| | |
|---|---|
| *G06F 15/173* | (2006.01) |
| *H04L 41/0823* | (2022.01) |
| *H04L 41/12* | (2022.01) |
| *H04L 45/64* | (2022.01) |
| *H04L 45/586* | (2022.01) |
| *H04L 41/14* | (2022.01) |

(52) U.S. Cl.
CPC .......... *H04L 41/0823* (2013.01); *H04L 41/12* (2013.01); *H04L 41/14* (2013.01); *H04L 45/586* (2013.01); *H04L 45/64* (2013.01)

(58) Field of Classification Search
CPC ... H04L 41/0823; H04L 41/12; H04L 41/586; H04L 45/586; H04L 41/41; H04L 45/64
See application file for complete search history.

(56) References Cited

U.S. PATENT DOCUMENTS

| | | | |
|---|---|---|---|
| 11,057,480 B1* | 7/2021 | Wells | H04L 67/1019 |
| 11,070,621 B1* | 7/2021 | Tornow | H04L 67/34 |
| 2012/0131561 A1 | 5/2012 | Spiess et al. | |
| 2017/0131980 A1 | 5/2017 | Velandy et al. | |
| 2019/0384580 A1 | 12/2019 | Martini et al. | |
| 2020/0272431 A1 | 8/2020 | Chiosi et al. | |
| 2021/0218750 A1* | 7/2021 | Wells | H04L 63/20 |
| 2022/0070154 A1* | 3/2022 | Mestery | H04L 12/4633 |

OTHER PUBLICATIONS

Macedo, et al., "Programmable Networks From Software Defined Radio to Software Defined Networking", Article in IEEE Communications Surveys & Tutorials, Apr. 2015, 27 Pages.

* cited by examiner

*Primary Examiner* — Thanh T Nguyen
(74) *Attorney, Agent, or Firm* — Lee & Hayes, P.C.

(57) ABSTRACT

Techniques and mechanisms for using a domain-specific language (DSL) to express overall network behaviors by describing what network-level behavior is desired. A compiler breaks down the DSL into portions of executable code that are to be run at different network devices and locations of the network architecture. In some instances, the executable code output from the compiler may be used to determine what network functions, network devices, and/or network topology is required to implement the overall network behavior that is desired. In other examples, an inventory and/or topology of available network devices may be fed into the compiler, and the compiler may compile the DSL into executable code that is able to be supported by the inventory and/or topology of available network devices. Thus, the DSL can be used to describe overall network behaviors to easily generate executable code that is used to implement a desired network-level behavior.

20 Claims, 16 Drawing Sheets

700

702 →
```
# Program a NAT device that is going to participate in the whole-network behaviour
procedure participate(session_ident,
                db, LBs, nat_devs,
                A_vrf, A_anycast_ip,
                B_vrf, B_anycast_ip, B_dest_addrs):

for each device in nat_devs:
    save details locally as (session_ident -> session_info)

add A_vrf to the NAT box with A_anycast_ip
    add B_vrf to the NAT box with B_anycast_ip attach behaviour learn(session_ident, packet) to session init packets received for forwarding to
A_anycast_ip
    attach behaviour notify(session_ident, src_addr, src_port, B_anycast_ip, B_port) if a nat-learn
control message is received program A_vrf routers to route B_dest_addrs via A_anycast_ip
```

704 →
```
# React to packets incoming on the programmed device
procedure learn(session_ident,
            init_packet):

find a free port on (B_anycast_ip, B_port) by consulting session_info[session_ident].DB
    attach (init_packet.src_addr, init_packet.src_port,
    init_packet.dest_addr, init_packet.dest_port) and record in the DB Locally:
    program a rewrite rule from (src_addr, src_port) on the packet to (B_anycast_ip, B_port)
    program an emit rule emitting the packet into session_info[session_ident].B_vrf Send a nat-learn message to all other_net_devs containing (session_ident, src_addr, src_port,
B_anycast_ip, B_port)

procedure notify(session_ident, src_addr, src_port, B_anycast_ip, B_port):

Locally:
    program a rewrite rule from (src_addr, src_port) on the packets received from
session_info[session_ident].A_vrf
    to (B_anycast_ip, B_port)
    program an emit rule emitting the packet into session_info[session_ident].B_vrf
```

706 →
```
# Configure the whole network to have NAT behaviour
procedure setup_nat(session_ident,
                A_vrf, A_anycast_ip,
                B_vrf, B_anycast_ip, B_dest_addrs):

find devices in network matching constraint 'ingress to A_vrf'
    add route B_dest_addrs via A_anycast_ip find devices in network matching 'has NAT functionality' find a DB in the network call participate(session_ident, DB, ingress_devices, nat_devices,
                A_vrf, A_anycast_ip,
                B_vrf, B_anycast_ip, B_dest_addrs)
```

710 ⟶
```
'This is what I want from the network' DSL – NAT for my device setup_nat(1, # unique identifier in case I'm doing more NAT sessions
     vrf-A, 172.29.130.102,  # my home network
     vrf-B, 10.0.0.1, # my internet connections
       10.0.0.*/8)  # addresses I will find on the internet
```

FIG. 7B

USING A DOMAIN-SPECIFIC LANGUAGE TO DESCRIBE NETWORK-LEVEL BEHAVIOR

TECHNICAL FIELD

The present disclosure relates generally to using a domain-specific language (DSL) to describe a desired network-level behavior for a network architecture, compiling the description of the network behavior from the DSL into executable code, and deploying portions of the code to network devices in the network architecture to implement the network-level behavior.

BACKGROUND

Computer networks are generally groups of computers or other devices that are communicatively connected and use one or more communication protocols to exchange data, such as by using packet switching. For instance, computer networking can refer to connected computing devices, such as user devices, routers, access points, switches, servers, etc., that communicate with one another. Modern-day networks deliver various types of network architectures, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, and so forth.

These networks include specialized network devices to communicate packets representing various data from device-to-device. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

Computing networks have continued to become more complex, such as with the introduction of software-defined networks (SDNs). In SDNs, the management of networks is centralized at a controller such that the control plane is abstracted from the data forwarding functions in the discrete networking devices. The SDN controller is the core element of an SDN architecture and enables centralized management and control, automation, and policy enforcement across physical and virtual network environments. Various standards or protocols have been developed for SDN architectures, such as OpenFlow, Programming Protocol-independent Packet Processors (P4), open virtual switch database (OVSDB), Python, and so forth. These SDN protocols allows the SDN controller to directly interact with the forwarding plane of network devices (such as switches and routers) using, for example, various application programming interfaces (APIs).

Traditionally, SDN controllers would use these SDN protocols to program network devices or push down changes to the switch/router flow-table, thereby allowing the SDN controller to partition traffic, control flows for optimal performance, test new configurations and applications, and/or otherwise control or steer data plane traffic. However, software-defined networks can have various problems, such as problems around how to add network functions to a single device (e.g., adding control and forwarding behavior to the device), and how to add network functions that emerge through a system of devices in the network (e.g., creating a model using the SDN controller to instruct components in the network to perform portions of the overall network functions). For instance, protocols such as Segment Routing Traffic Engineering (SR-TE) can be used to control or engineer traffic flows in a network.

However, it can be difficult to ensure that an end-to-end, or overall, network architecture behaves according to a desired operation or functionality. The models used by SDN controllers have various issues, such as network being programmed is distributed, the programmer that writes the programs requires skills in distributed system programming (which may result in concerns such as message latency, behavioral consistency, race conditions, etc.).

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1 further illustrates a network controller in a network architecture compiling the description of the network behavior from the DSL into executable code, and deploying portions of the code to network devices in the network architecture to implement the network-level behavior.

FIGS. 7A and 7B illustrate respective examples of using a DSL to express an overall network behavior description.

FIG. 12A illustrates expressing the overall network behavior description using the domain-specific language as well as at least one of a Go programming language or a Rust programming language, and FIG. 12B illustrates expressing the overall network behavior description using the domain-specific language as well as a Python programming language.

DESCRIPTION OF EXAMPLE EMBODIMENTS

Overview

Figure 1:
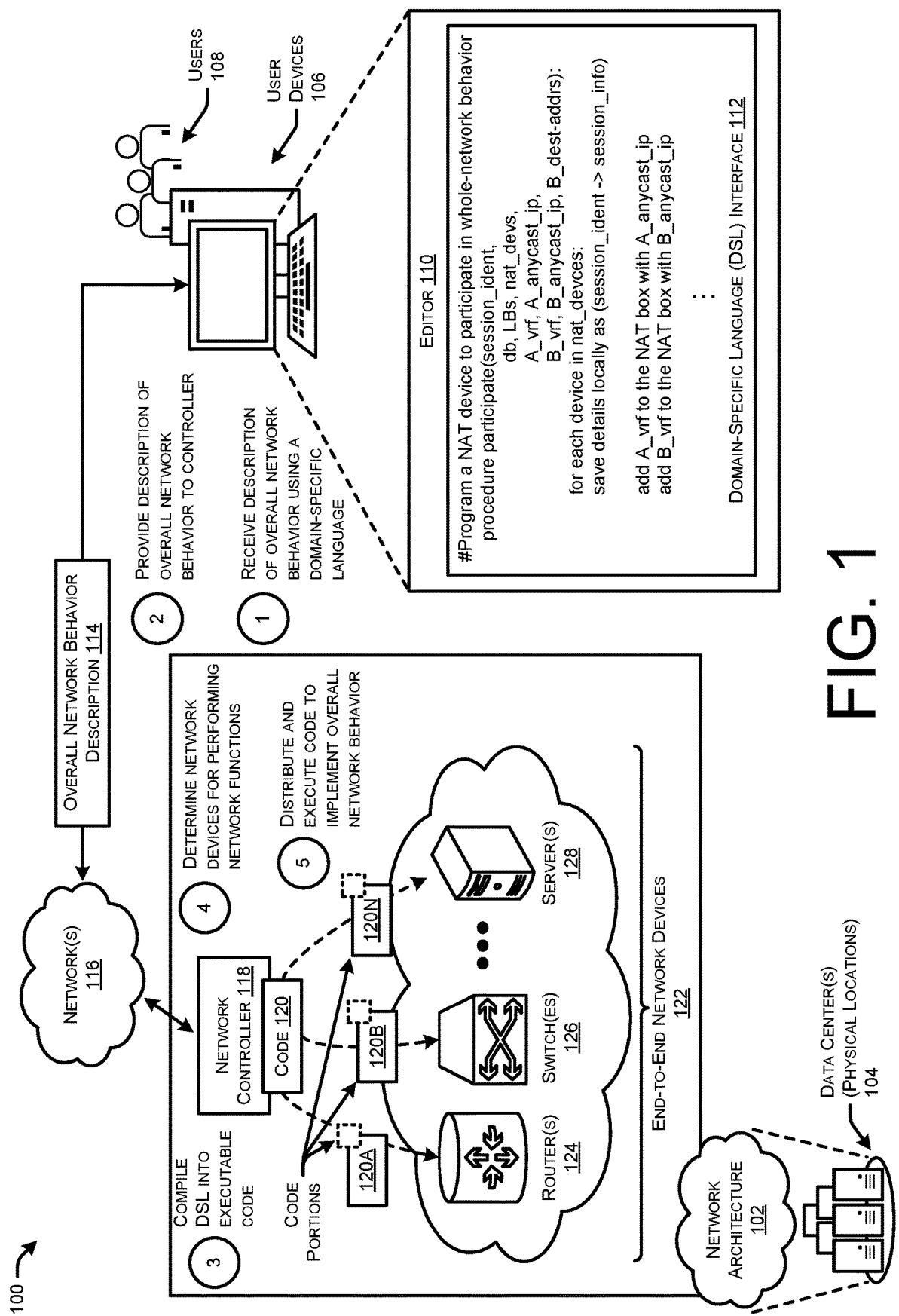
FIG. 1 illustrates a system-architecture diagram of an environment in which a user of a user device utilizes a domain-specific language to describe a desired network-level behavior for a network architecture.

The present disclosure relates generally to using a DSL to describe a desired network-level behavior for a network architecture, compiling the description of the network behavior from the DSL into executable code, and deploying portions of the code to network devices in the network architecture to implement the network-level behavior.

A method described herein includes using a domain-specific language (DSL) to define an overall network behavior of a network architecture. The method may include receiving first code, expressed in the DSL, that defines the overall network behavior for the network architecture where the DSL being a network description language usable to define end-to-end network behaviors for network architectures. The method may further include compiling the first code into second code that is executable by a plurality of network devices to perform one or more network functions. Additionally, the method may include identifying a first portion of the second code corresponding to a first network function used to implement the overall network behavior, and identifying a second portion of the second code corresponding to a second network function used to implement the overall network behavior. Even further, the method may include identifying a first network device as being optimized to perform the first network function, and identifying a second network device as being optimized to perform the second network function. In some instances, the method may further include deploying the first portion of the second code to the first network device, and deploying the second portion of the second code to the second network device.

Additionally, the techniques of at least the first method, second method, and third method, and any other techniques described herein, may be performed by a system and/or device having non-transitory computer-readable media storing computer-executable instructions that, when executed by one or more processors, performs the method(s) described above.

Example Embodiments

This disclosure describes techniques for using a domain-specific language (DSL) to describe overall (or "end-to-end") network behaviors by describing what network-level behavior is desired, where the DSL is a computer language specialized to a particular domain, such as an overall network-function domain. A compiler is then used to break down the DSL into pieces or portions of executable code that are to be run at different network devices and locations of the network architecture. In some instances, the executable code output from the compiler may be used to determine what network functions, network devices, and/or network topology is required to implement the overall network behavior that is desired. In other examples, an inventory and/or topology of available network devices and components may be fed into the compiler, and the compiler may compile the DSL into executable code that is able to be supported by the inventory and/or topology of available network devices and components. Thus, the DSL can be used to describe overall network behaviors to easily generate executable code that is used to implement a desired network-level behavior.

In some instances, the DSL may be used to describe the overall network behavior for an entire network without specifying any network devices at all. For example, a user may simply use the DSL to express or define a desired overall network behavior without references network devices that are required to implement the network behavior. In such an example, a compiler may then take the DSL and compile it into portions of executable code that generally represent individual network functions or behaviors that are required to implement the overall network behavior. Based on the required network functions, a network orchestrator (often referred to herein as an "SDN controller") may determine what types of network devices, components, topologies, etc., are required to implement the overall network behaviors defined using the DSL. The SDN controller may then configure the network architecture according to a required topology of network devices and push down portions of the executable code to the appropriate devices to implement the overall network behavior in the network architecture.

In some instances, the compiler may not only be provided with the DSL describing the desired overall network behavior, but may also be provided with inventory data representing available network devices and/or topology data indicating a network topology of a network architecture. The compiler may then consider the available network devices and/or available network topology when compiling the DSL to ensure that the resulting executable code can be supported by the available network devices and/or available network topology to implement the overall network behavior. In some instances, the compiler may render the executable code to specific device models (e.g., SmartNICs, FPGAs, NPU programming, etc.) in order to ensure that the executable code is able to be run on the available network devices.

In some instances, the executable code into which the DSL is compiled may include one or more serverless network functions. For background, network devices have traditionally run the different types of network functions (e.g., packet drop functions, packet duplicate functions, packet forward functions, etc.) directly on hardware of the network devices (e.g., bare metal implementation). However, it can be inefficient, insecure, or otherwise disadvantageous to run various types of network functions on a same network device. For instance, due to the different types of networking functions that network devices are required to execute, the scale, diversity, and cost of hardware needed to efficiently run these network functions is greatly increased. Additionally, as needs of the network change, it may be necessary to update software running in the network, which can require replacement or update of the hardware in the network (e.g., replacing entire network devices or components in the devices).

In light of various inefficiencies and disadvantages of running network functions directly on hardware of network devices, network functions virtualization (NFV) technologies have emerged in order to separate network functions from underlying hardware to create a virtualized network that can run on commodity hardware, allowing networks to be more flexible and cost-effective. NFV technologies use virtual network functions (VNFs) that handle specific network functions, such as firewall functions, load balancing functions, packet-routing functions, and so forth. Thus, there has been a shift in networking from using several pieces of hardware, each performing a single function, to having several virtual machines (VMs) within a single piece of hardware where each VM is performing the actions of one or more VNFs. Even further, recent advances have included using containers for network function virtualization. That is, rather than simply using multiple VMs that act as a hardware virtualization, containers act as an operating system (OS) virtualization. The containers are able to share the same host OS of a VM, but may be able to run individual VNFs in an isolated manner such that each VM may support multiple containerized VNFs. However, various inefficiencies and disadvantages still exist when running VNFs in VMs and containers.

This disclosure further describes techniques and mechanisms for compiling the DSL into one or more serverless network functions, and deploying the serverless network functions on network devices to implement the overall network behavior. In some examples, the serverless network functions may be expressed entirely in the DSL (e.g., via a text-based editor, a graphics-based editor, etc.), where the DSL is a computer language specialized to a particular domain, such as a network function domain. In additional examples, the serverless network functions may be expressed and compiled using a DSL in combination with a general-purpose language (GSL). Once the serverless network functions have been expressed and/or compiled, the techniques of this disclosure further include deploying the serverless network functions to network devices and/or network components that are configured to perform the serverless network functions.

As described herein, the domain-specific language, or DSL, is a computer language specialized to a particular domain. This disclosure describes a DSL that is specialized to express networking functions that are to be performed by network devices (e.g., routers, switches, etc.). The DSL is then able to be compiled into code that represents serverless network functions that are executable by network devices to perform various actions, such as packet-acquisition functions, packet-generation functions, packet-duplication functions, packet-drop functions, packet-forwarding functions, and so forth. Similar to how Hypertext Markup Language (HTML) is a DSL for creating web pages, the DSL described herein may be specific or specialized to express network functions, and more specifically, serverless network functions.

As described herein, a serverless function is generally a programmatic function where a piece of code is executed dynamically, such as in response to a predefined event. Thus, resources needed to execute a serverless function are similarly allocated dynamically, or allocated at run time, in contrast with the computing resources needed to support long-running VMs or containers. Thus, a serverless network function may comprise a network function (e.g., packet-drop function, packet-forward function, etc.) that is dynamically executed in response to a particular event, such as a network device receiving one or more packets in a flow. Serverless network functions may be used to perform a variety of networking functions, and be deployed to different network devices based on the functions those devices perform in the network architecture that implements the overall network behavior.

Thus, a user of a user device may express an overall network behavior in a DSL that is a specialized, or domain specific, programming language usable to express overall network behaviors comprised of one or more networking functions. The DSL may comprise a formal programming language comprising a set of instructions that produce a desired result by network functions, such as one or more serverless network functions. For instance, the DSL may be a programming language written in an imperative form (e.g., sequence of operations to perform), a declarative form (e.g., the desired result is specified), and/or another form. Generally, the DSL may be a programming language that has syntax (or form) as well as semantics (or meaning), and may be defined by a standard or specification (e.g., the C programming language is specified by an ISO Standard). Further, the DSL may have various built-in libraries, functions, APIs, and so forth.

In some examples, users of user devices may run an editor on their user devices to receive input that expresses an overall network behavior at least partly using the DSL. The input may be text-based input, graphics-based input, and/or a combination thereof. For instance, text may be input into the editor that represents a portion of a overall network behavior in the DSL, graphical icons may be placed into the editor that represents at least a portion of a overall network behavior in the DSL, and/or a combination thereof. Once a user has expressed overall network behavior(s) using the DSL, the user may run a compiler, which may be a DSL-specific compiler, transpiler, etc., to compile to target code, or generate target code, that is executable by a plurality of network devices to implement the desired overall network behavior.

In some examples, the techniques described herein may include using a combination of the DSL and a general-purpose language (GPL) to express and create descriptions of overall network behaviors. For instance, by knowing the nature of the DSL and GPL(s), the techniques described herein include compiling source code written using a combination of DSL and GPL into code (such as object code or other machine code) that is executable to perform or implement desired overall network behaviors. The GPL may comprise any type of GPL usable to define network functions, such as a Go programming language (often referred to as "Golang"), a Rust programming language, a Python programming language, a P4 programming language, an OVSDB programming language, and/or any other language that is usable to define network functions.

In some instances, the DSL and GPL may integrate such that the different languages represent different components or portions of overall network behaviors. For instance, the DSL and GSL portions of the overall network behavior(s) may integrate using built in connections. As an example, a component may be expressed in the DSL, and a component may be expressed in a GPL, such as Rust or Golang, and the DSL and GPL may interface or interact using channels (e.g., asynchronous channels). That is, Rust channels and Golang channels may be used as pipes to connect concurrently running components, such as a DSL-based component and a GPL-based component. In another example where the GPL is a Python language, the DSL-based component and a GPL-based component may be connected using the asyncio library (e.g., a set of high-level APIs, low-level APIs, etc.) which is utilized to connect the asynchronous components.

In some instances, the DSP and GPL may integrate according to other techniques. For instance, the DSL may be designed to allow GPL code to be embedded into the DSL code and compiled (or transpiled) into a combined piece of code. Alternatively, the DSL may be configured such that the DSL code may be able to be embedded into GPL code and compiled (or transpiled) into a combined piece of code. The compiler may be configured to ensure that the resulting code is a combination of the functionality expressed in DSL and the functionality expressed in GPL, as well as the cross-link between the portions of the resulting code expressed in the different languages. By combining the DSL with a GPL, a user is provided the benefit of being able to use the DSL to succinctly express overall network behaviors, and also provided the benefit of being able to use a GPL, which the user may be familiar with, to express a portion of the overall network behaviors. The compiler may be configured to identify which portions of the code are written in the DSL versus GPL (e.g., identify semantics, identify syntax, etc.), and ensure that the portions of the code are appropriately compiled into a desired piece of output code representing the desired overall network behavior(s).

Once a user has finished expressing a desired overall network behavior via an editor using either the DSL on its own or in conjunction with a GPL, a network controller may received the DSL code and compile the DSL into a desired target code. The network controller may manage the network architecture in which the overall network behavior is to be deployed. The network controller may be configured to determine network component or devices on which the portions of the executable code is to be deployed. The network controller may determine optimized placement locations for portions of the overall network behavior.

The network controller may manage the network architecture, and maintain data regarding the state and layout of the network architecture. The controller may utilize this information and data to determine locations, or network components/devices, on which to deploy portions of the executable code for implementing the overall network behavior. That is, the controller may determine a network component that has characteristics which are optimal for executing a portion of the executable code based on a type or characteristic of the particular network function represented by the executable code.

As described herein, a network component may comprise any type of component, hardware-based, software-based, etc., that is capable of hosting or running at least a portion of an overall network behavior, such as a particular network function. For example, a network component may comprise hardware-based devices such as a router, a network switch (e.g., leaf switch, spine switch, etc.), a gateway, a network interface card (NIC), a smart NIC, a server, a Field Programmable Gate Array (FPGA), an Application-Specific Integrated Circuit (ASIC), and/or any other hardware device capable of executing a network function (including a serverless network function). The network component may comprise a software-based component as well, such as a virtual machine, container, and so forth.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an environment 100 that includes a network architecture 102 that may include one or more data centers 102, and in which users 108 of user devices 106 utilizes a domain-specific language to describe a desired network-level behavior for the network architecture 102. FIG. 1 further illustrates a network controller 118 of the network architecture 102 compiling the description of the network behavior from the DSL into executable code, and deploying portions of the code to network devices in the network architecture 102 to implement the network-level behavior.

In some examples, the network architecture 102 may include devices housed or located in one or more data centers 104. The network architecture 102 may include one or more networks implemented by any viable communication technology, such as wired and/or wireless modalities and/or technologies. The network architecture 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network architecture 102 may include devices, virtual resources, or other nodes that relay packets from one network segment to another by nodes in the computer network. The network architecture 102 may include multiple devices that utilize the network layer (and/or session layer, transport layer, etc.) in the OSI model for packet forwarding, and/or other layers. The network architecture 102 may include various hardware devices, such as routers, switches, gateways, smart NICs, NICs, ASICs, FPGAs, servers, and/or any other type of device. Further, the network architecture 102 may include virtual resources, such as VMs, containers, and/or other virtual resources.

The one or more data centers 104 may be physical facilities or buildings located across geographic areas that designated to store networked devices that are part of the network architecture 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the packet-forwarding networks 102 may not be located in explicitly defined data centers 104, but may be located in other locations or buildings.

The user devices 106 may establish communication connections over one or more networks 116 to communicate with devices in the network architecture 102, such as a network controller 118 of the network architecture 102. The network(s) 116 may include any viable communication technology, such as wired and/or wireless modalities and/or technologies. Networks 116 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The user devices 106 may communicate using any type of protocol over the network 116, such as the transmission control protocol/Internet protocol (TCP/IP) that is used to govern connects to and over the Internet.

As illustrated, the user devices 106 may be running an editor 110 that is presented in a DSL interface 112 and that is configured to receive input using a DSL to express and create overall, network-level behaviors. As illustrated, the editor 110 may receive, at "1," portion of source code, which is simply be illustrated as pseudocode, representing an example DSL that is being used to program a NAT device to participate in a whole-network behavior. Although only a portion of the DSL is shown, the DSL interface 112 may receive the entire description of the desired whole-network behavior in DSL (potentially in conjunction with a GPL). The user 108 may express the overall network behavior using text input, graphical icons, and/or a combination thereof. In some instances, all of the source code representing overall network behavior may be expressed using the DSL, and in other examples, a first portion of the source code may be expressed using the DSL, and a second portion of the source code may be expressed using a GPL, such as Golang, Rust, Python, P4, and so forth.

At "2," the user device 106 may provide the overall network behavior description 114 to the network controller 118. For instance, the user 108 of the user device 106 may provide overall network behavior description 114 to the network controller 118 over the network(s) 116 and via a web-accessible portal, via an API, via an interface (e.g., CLI), and/or through any other mechanism. In some instances, the expression of the overall network behavior description 114 may be compiled from the DSL into a target code locally on the user device 106, and in some instances, the DSL may be sent as the overall network behavior description 114 in DSL to the network controller 118. Thus, the overall network behavior description 114 may be in any programming language, post-compilation or pre-compilation, and generally correspond to a description of a whole-network behavior or behaviors.

At "3," the network controller 118 may compile the DSL into executable code 120. For instance, the network controller 118 may be running a compiler that compiles the definition, description, or expression, of the overall network behavior 114 into a target code. The compiler running on the user device 106 may comprise any type of compiler, such as a DSL-specific compiler, a transcompiler/transpiler configured to compile DSL-based input and GPL-based input into executable code 120, and/or any other type of compiler. The compiler may be configurable to compile the overall network behavior definition 114 from the DSL-based expression (e.g., source code) into target code of a plurality of different programming languages. For instance, the DSL representing the overall network behavior definition 114 may compile into target code in various languages, such as an OpenFlow programming language program, a P4 programming language program, a Linux Extended Berkeley Packet Filter (eBPF) program, a program configured to execute on a smart Network Interface Controller (NIC), a hardware description language associated with at least one of a Field-Programmable Gate Array (FPGA) or an Application Specific Integrated Circuit (ASIC), or a Vector Packet Processor (VPP) program.

In some instances, the DSL may be used to describe the overall network behavior definition 114 for the entire network architecture 102 without specifying any network devices at all. For example, a user 108 may simply use the DSL to express or define a desired overall network behavior definition 114 without references network devices that are required to implement the network behavior. In such an example, the compiler may then take the DSL and compile it into portions of executable code 120 that generally represent individual network functions or behaviors that are required to implement the overall network behavior on the network architecture. Based on the required network functions, the network controller 118 may determine what types of network devices, components, topologies, etc., are required to implement the overall network behavior definition 114 defined using the DSL. The network controller 118 may then configure the network architecture 102 according to a required topology of network devices and push down portions of the executable code to the appropriate devices to implement the overall network behavior in the network architecture 102.

In some instances, the compiler may not only be provided with the DSL describing the desired overall network behavior 114, but may also be provided with inventory data representing available network devices and/or topology data indicating a network topology of a network architecture. As illustrated, the network architecture 102 may include a set of end-to-end network devices 122 that may be available to support or implement the desired overall network behavior. In some instances, the network devices 122 include various network devices and components, such as routers 124, spine switches 126, leaf switches, servers 128, and/or other network components. Although not illustrated, the network architecture may additionally, or alternatively, include gateways, NICs and smartNICs, FPGAs, ASICs, virtual machines, containers, and/or any other type of hardware-based or software-based network component.

The compiler may then consider the available network devices and/or available network topology when compiling the DSL to ensure that the resulting executable code 120 can be supported by the available network devices 122 and/or available network topology to implement the overall network behavior. In some instances, the compiler may render the executable code 120 to specific device models (e.g., SmartNICs, FPGAs, NPU programming, etc.) in order to ensure that the executable code is able to be run on the available network devices. In some instances, the executable code 120 into which the DSL is compiled may include one or more serverless network functions.

At "4," the network controller 118 may determine network devices 122 for performing the network functions that make-up the desired overall network behavior. For instance, the network controller 118 may compile the DSL into different portions of code 120A-120N (where "N" is any integer greater than 1), and determine the different types of network functions represented by the resulting code portions 120. In some instances a particular network function that is performed by code portion 120A may be executable by a router 124 (e.g., the type of code, the type of network function, the type of devices that the router is 124, the language in which the code portion 120A is written, the location of the router 124 in the network architecture 102, etc.). Similarly, network function(s) performed by executing the code portions 120B may be determined to be performed by a switch 126, and so forth. In some instances, the code portions 120 may each be one or more serverless network functions, but they could be other types of executable code as well.

At "5," the network controller 118 may distribute the code portions 120 to the different network devices/components 122, and the network devices/components 122 may execute the code 120 to implement the overall network behavior 114. In some instances, some or all of the code portions 120 may be serverless network functions, and in other examples, the code portions 120 may be other types of network functions.

In this way, a user 108 may be able to use a DSL to express or define a desired overall network behavior. In some instances, the user 108 need not even have knowledge of what network devices 122 are needed to implement the overall network behavior, and a compiler may determine network devices and/or a network topology for implementing a network architecture 102 to implement the overall network behavior.

Figure 2:
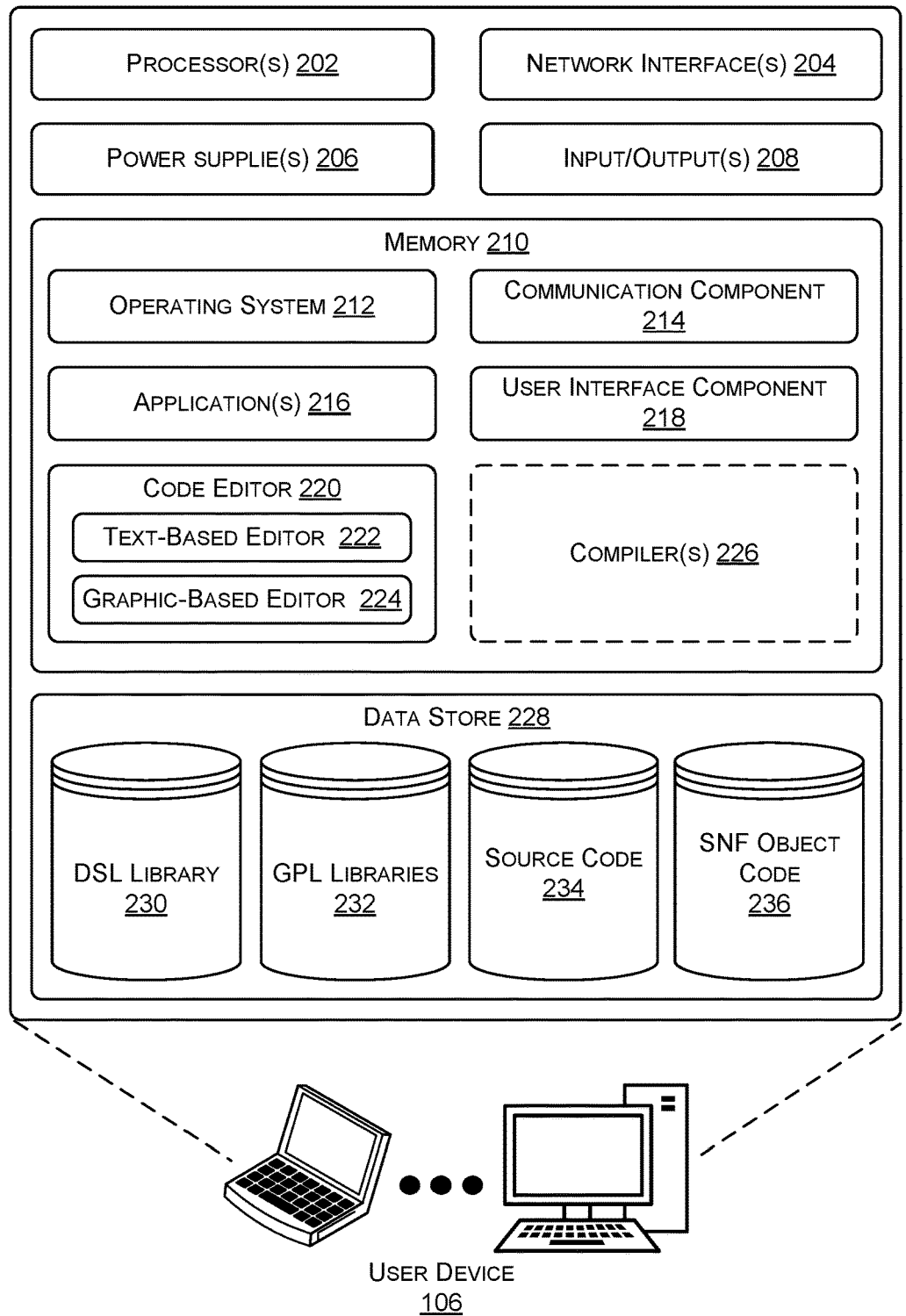
FIG. 2 illustrates a component diagram of an example user device through which a user can describe a desired network-level behavior for a network architecture at least partly using a domain-specific language.

FIG. 2 illustrates a component diagram 200 of an example user device (e.g., user device 106) through which a user 108 can describe a desired network-level behavior for a network architecture 102 at least partly using a domain-specific language. The user device 106 may be any type of computing device capable of receiving expressions of overall, network-level behaviors via at least a DSL interface 112 and sending overall network behavior descriptions 114 to the network 116 via a suitable data communications network such as, but not limited to, a laptop or desktop computer, a tablet computing device, a server computer, a television, or a mobile telephone.

As illustrated, the user device 106 may include one or more hardware processors 202 (processors), one or more devices, configured to execute one or more stored instructions. The processor(s) 202 may comprise one or more cores. Further, the user device 106 may include one or more network interfaces 204 configured to provide communications between the user device 106 and other devices, such as the network controller 118, and/or other systems or devices in the network architecture 102 and/or remote from the network architecture 102. The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi, and so forth.

The user device 206 can include one or more power supplies 206, such as one or more batteries, connections to mains power, etc. The user device 106 can also include one or more inputs and outputs 208 for receiving and processing input from a number of input devices, such as a keyboard, a mouse, a touchpad, a touch screen, an electronic stylus, or other type of input device. Further, the input/outputs 208 can include a display, such as a computer monitor, a flat-panel display, a digital projector, a printer, or other type of output device. It will be appreciated that the user device 106 might not include all of the components shown in FIG. 2, can include other components that are not explicitly shown in FIG. 2, or might utilize an architecture completely different than that shown in FIG. 2.

The user device 106 may also include memory 210, such as computer-readable media, that stores various executable components (e.g., software-based components, firmware-based components, etc.). The memory 210 may generally store components to implement functionality described herein. The memory 210 may store an operating system 212 utilized to control the operation of components of the user device 106. Further, the memory 210 may store a communication component 214 that comprises software (e.g., any protocol stack) to enable the user device 106 to communicate with other devices using the network interface 204. Even further, the memory 210 may store one or more applications 216, which may generally comprise any type of software application to perform various functionalities.

In some instances, the memory 210 may store a user interface component 218 configured to present user interfaces on a display of the user device 106, such as the DSL interface 112 through which the editor 110 receives expressions of overall network behavior 114 written in the DSL. The user device 106 may further store a code editor 220 (e.g., editor 110) that includes a text-based editor 222 as well as a graphic-based editor 224. As described in more detail with respect to at least FIGS. 7A and 7B, the text-based editor 222 may be configured to receive text input that expresses a network-level behavior 114 in a DSL, and the graphic-based editor 224 may be configured to receive graphical icons that are expressive of at least portions of a network-level behavior 114 according to the DSL. In this way, the code editor 220 may receive expressions of network-level behavior(s) 114 using a DSL via a text-based input, a graphics-based input, and/or a combination thereof.

The memory 210 may further store one or more DSL compilers 226 as well as a DSL and GPL compiler. The DSL compiler(s) 226 may generally comprise any type of compilers that are configured to take source code, input code, human-readable code, etc., analyze it, and generate or produce a computer-readable code (e.g., binary, machine code, object code, byte code, etc.). In some instances, the DSL compiler(s) 226 may, rather than going straight to machine code, go to assemble, or a different human-readable language. The compiler may comprise any type of compiler, including a source-to-source compiler (or transcompiler). For instance, in examples where serverless network functions are expressed using a combination of a DSL and a GPL, the DSL compiler(s) 226 may convert source code of the DSL into source code of the GPL such that all of the source code is in the GPL before ultimately compiling into target code (or machine code). Similarly, the DSL compiler(s) 226 may convert the code of the GPL into source code of the DSL before compiling all of the code expressed in the DSL into target code (such as machine code).

In some instances, the DSL compiler(s) 226 may be configured to accept graphical icons as input that represent portions of an overall network-level behavior 114. The graphical icons may represent text in the DSL and be transformed into the DSL text prior to being compiled. In other examples, the DSL compiler(s) 226 may be configured to compile the graphical icons directly into machine code. The DSL compiler(s) 226 may be similar to a React (web framework) in that the DSL compiler(s) 226 includes a pre-compiler that is built in where the DSL that is embedded in the GPL is spotted as not being the GPL (e.g., different syntax or semantics) is translated into the GPL such that all of the source code is ultimately pre-compiled into the GPL. The GPL can then be compiled into any desired backend target code or object code. However, in other examples the DSL compiler(s) 226 may include a pre-compiler that spots GPL code that is embedded in the DSL code, and pre-compiles the GPL code into DSL code such that all of the source code is expressed in DSL prior to performing the compiling to a desired target code, or object code. In some instances, the DSL compiler(s) 226 may include a transpiler as in the React example where DSL and GPL can be compiled into a version that can be compiled, if necessary, using the primary language of the compiler (e.g., DSL, GPL, etc.). Thus, the DSL compiler(s) 226 may include one or more compilers that enable a user to utilize the code editor 220 to express overall network-level behaviors 114 using DSL alone, or in combination with a GPL.

The DSL compiler(s) 226 may generally be able to compile into computer code in any computer language that is executable on a plurality of different types of network components. For instance, the DSL compiler(s) 226 may be able to compile into an OpenFlow programming language program, a P4 programming language program a Linux Extended Berkeley Packet Filter (eBPF) program, a program configured to execute on a smart Network Interface Controller (NIC), a hardware description language associated with at least one of a Field-Programmable Gate Array (FPGA) or an Application Specific Integrated Circuit (ASIC), or a Vector Packet Processor (VPP) program, any type of machine code, object code, byte code, machine code, binary, and/or any type of executable code that may be executed by any type of device or network component. Thus, the DSL compiler(s) 226 may be configured to compile source code, written at least partially in a DSL, that expresses or represents an overall network behavior 114 into any type of target or output code.

The user device 106 may further include a data store 228, which may comprise any type of computer memory including long-term memory (e.g., Read Only Memory (ROM), Random Access Memory (RAM), caches, etc.). The data store 228 may include a DSL library 230 that includes resources used to express overall network behaviors 114 using the DSL, such as macros, type definitions and functions for tasks such as string handling, mathematical computations, input/output processing, memory management, and various other system services. Similarly, the data store GPL libraries 232 may comprise any type of library for any type of GPL language. The data store 228 may include source code that has been expressed by a user of the user device 106, and/or downloaded from code repositories, that represent serverless network functions and/or other programs. Further, the data store 228 may include SNF object code 236 in examples where the source code 234 is compiled locally on the user device 106 by the DSL compiler(s) 226.

Figure 3:
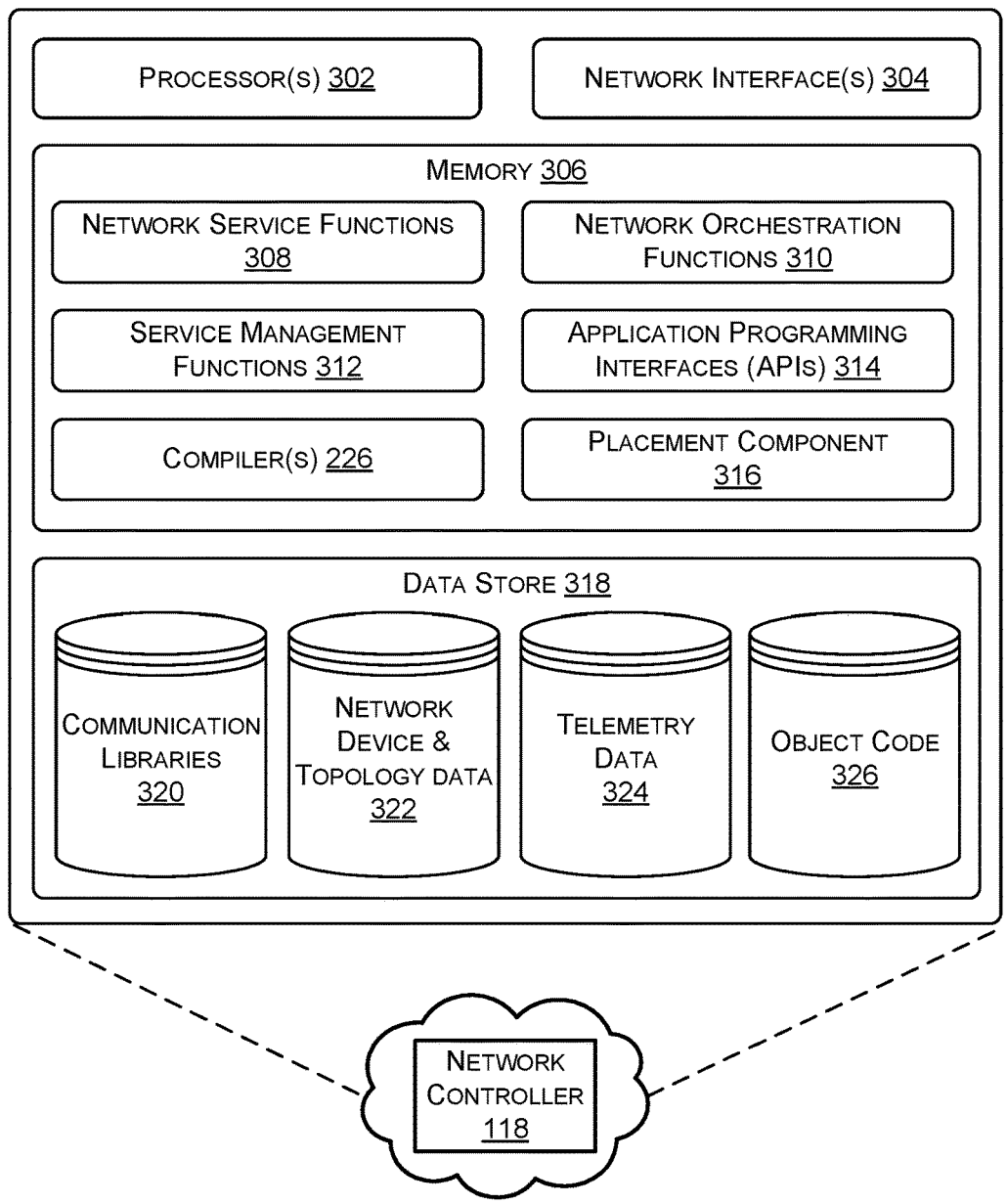
FIG. 3 illustrates a component diagram of an example network controller that receives a description of a desired network-level behavior for a network architecture in a DSL, compiles the DSL into executable code, and deploys portions of the code to network devices in the network architecture to implement the network-level behavior.

FIG. 3 illustrates a component diagram 300 of an example network controller (e.g., network controller 118) that receives overall network behavior descriptions 114, compiles the DSL code into executable code, and deploys portions of the code 120 to different network devices 122 to implement the overall network behavior in a network architecture 102. In some instances, the network controller 118 may run on one or more computing devices in, or associated with, the network architecture 102 (e.g., a single device or a system of devices). The network controller 118 may comprise a single controller 118 that is running, or multiple instances of a network controller 118 running at least partly at a same time.

Generally, the network controller 118 may be a programmable controller that manages some or all of the control plane activities of the network architecture 102, and manages or monitors the network state using one or more centralized control models. Generally, the network controller 118 may handle at least the functions of (i) receiving DSL code including an overall network behavior description 114 (ii) compiling the DSL into executable code 120, and deploying portions of the code 120 to different network devices 122 in the network architecture 102 to implement a desired overall network behavior.

As illustrated, the network controller 118 may include, or run on, one or more hardware processors 302 (processors), one or more devices, configured to execute one or more stored instructions. The processor(s) 302 may comprise one or more cores. Further, the network controller 118 may include or be associated with (e.g., communicatively coupled to) one or more network interfaces 304 configured to provide communications with the user device 106 and other devices, and/or other systems or devices in the network architecture 102 and/or remote from the network architecture 102. The network interfaces 304 may include devices configured to couple to personal area networks (PANs), wired and wireless local area networks (LANs), wired and wireless wide area networks (WANs), and so forth. For example, the network interfaces 304 may include devices compatible with any networking protocol.

The network controller 118 may also include memory 306, such as computer-readable media, that stores various executable components (e.g., software-based components, firmware-based components, etc.). The memory 306 may generally store components to implement functionality described herein as being performed by the network controller 118. The memory 306 may store one or more network service functions 308, such as a slicing manager, a topology manager to manage a topology of the network architecture 102, a host tracker to track what network components are hosting which programs or software, a switch manager to manage switches of the network architecture 102, a process manager, and/or any other type of function performed by the network controller 118.

The network controller 118 may further include network orchestration functions 310 stored in memory 206 that perform various network functions, such as resource management, creating and managing network overlays, programmable APIs, provisioning or deploying applications, software, or code to hosts, and/or perform any other orchestration functions. Further, the memory 306 may store one or more service management functions 312 configured to manage the specific services of the network architecture 102 (configurable), and one or more APIs 314 for communicating with devices in the network architecture 102 and causing various control plane functions to occur. In some instances, the network controller 118 may include a plurality of compilers, such as the DLS compiler(s) 226, and use the DSL compiler(s) 226 to compile source code into target code before deploying the code to the network components. However, this occurs in instances when the user device 106 has not compiled the source code 234 into the final object code 236.

Further, the network controller 118 may include a placement component 316 that is configured to determine optimized (or advantageous) network components on which to run code portions 120 of the overall network behavior 114, and deploying/instantiating the network functions (which may be serverless network functions) on those network components. As described in more detail below, the placement component 316 may determine the optimized network component/device on which to deploy and instantiate network functions based on various criteria or characteristics, such as a computing-resource capacity, management difficulty for the controller 118, cost for running the serverless network function on a particular network component, security concerns, application locality (e.g., attaching a serverless network function to a specific SaaS compute function), a type of the serverless network function (e.g., the action performed), the type of target code of the SNF code 116, and so forth.

The network controller 118 may further include a data store 318, such as long-term storage, that stores communication libraries 320 for the different communication protocols that the network controller 118 is configured to use or perform. Additionally, the data store 318 may include network topology data 322, such as a model representing the layout of the network components in the network architecture 102. The data store 318 may store telemetry data 324 that indicates computing resource usage and/or availability on the different network components in the network architecture 102. Additionally, the data store 318 may store object code 326 (which it may receive and/or generate) that is to be deployed, and/or has been deployed, on network components.

Figure 4:
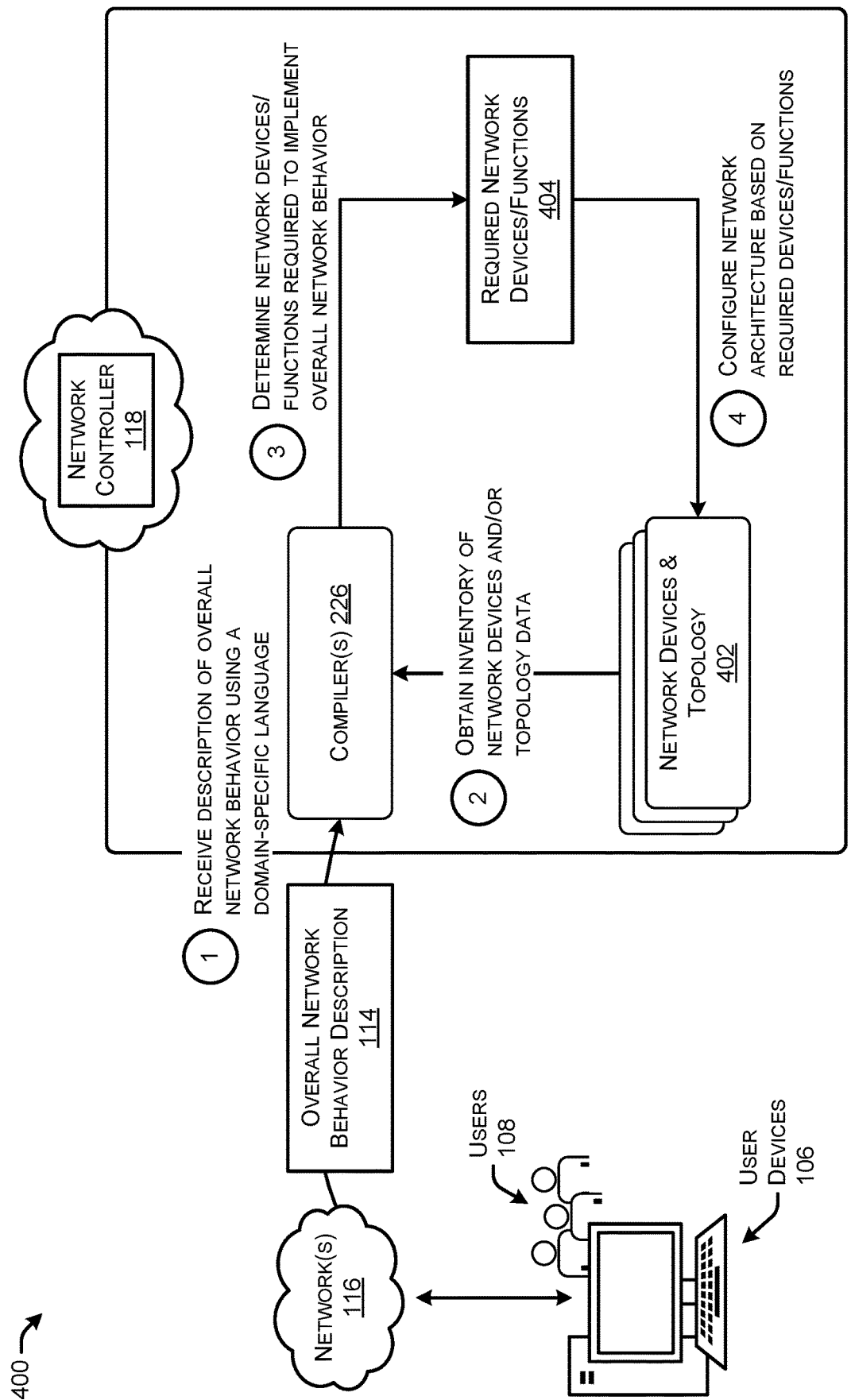
FIG. 4 illustrates a flow diagram of an example method for compiling an overall network behavior description from DSL into executable code, and using the code to determine what network devices and/or network functions are required to implement the overall network behavior description.

FIG. 4 illustrates a flow diagram of an example method 400 for compiling an overall network behavior description from DSL into executable code, and using the code to determine what network devices and/or network functions are required to implement the overall network behavior description.

At "1," the network controller 118 may receive a description of an overall network behavior that was expressed using a DSL. The DSL code representing the overall network behavior may be provided to the compiler(s) 226 associated with the network controller 118.

At "2," the compiler(s) 226 may obtain inventory data indicating available network devices and/or topology data indicating a topology of a network architecture 102 that is to be used to implement the overall network behavior. The network devices and topology data 402 may be collected or otherwise obtained by the network controller 118. Generally, the network devices and topology data 402 may indicate at least one of an amount of available network devices 122, types of the available network devices 122, locations of the network devices 122 in the network architecture 102, communication links between the network devices 122, and/or other information about the network devices 122.

At "3," the compiler(s) 226 may compile the DSL into executable code, which may be one or more different types of executable code, and determine what network devices/ functions are required to implement the overall network behavior. For instance, the compiler(s) 226 may be configured to compile the DSL into portions of code 120 that generally represent different network functions (e.g., packet drop, NAT behaviors, packet forwarding, etc.), and the compiler(s) 226 may determine what network devices are required to implement the code 120. In some instances, the DSL may be compiled into code portions 120 of different types of code based on what network device 122 is to execute that portion of the code 120.

At "4," the network controller 118 may configure the network architecture 102 based on the required network devices 122 and/or network functions. For example, the network controller 118 may instantiate, configure, reconfigure, or otherwise cause the network devices 122 in the network architecture 102 that are required to implement the overall network behavior to be deployed and arranged in a topology for performing the overall network behavior. The network controller 118 may then deploy the code portions 120 that implement the overall network behavior to the different network devices 122.

Figure 5:
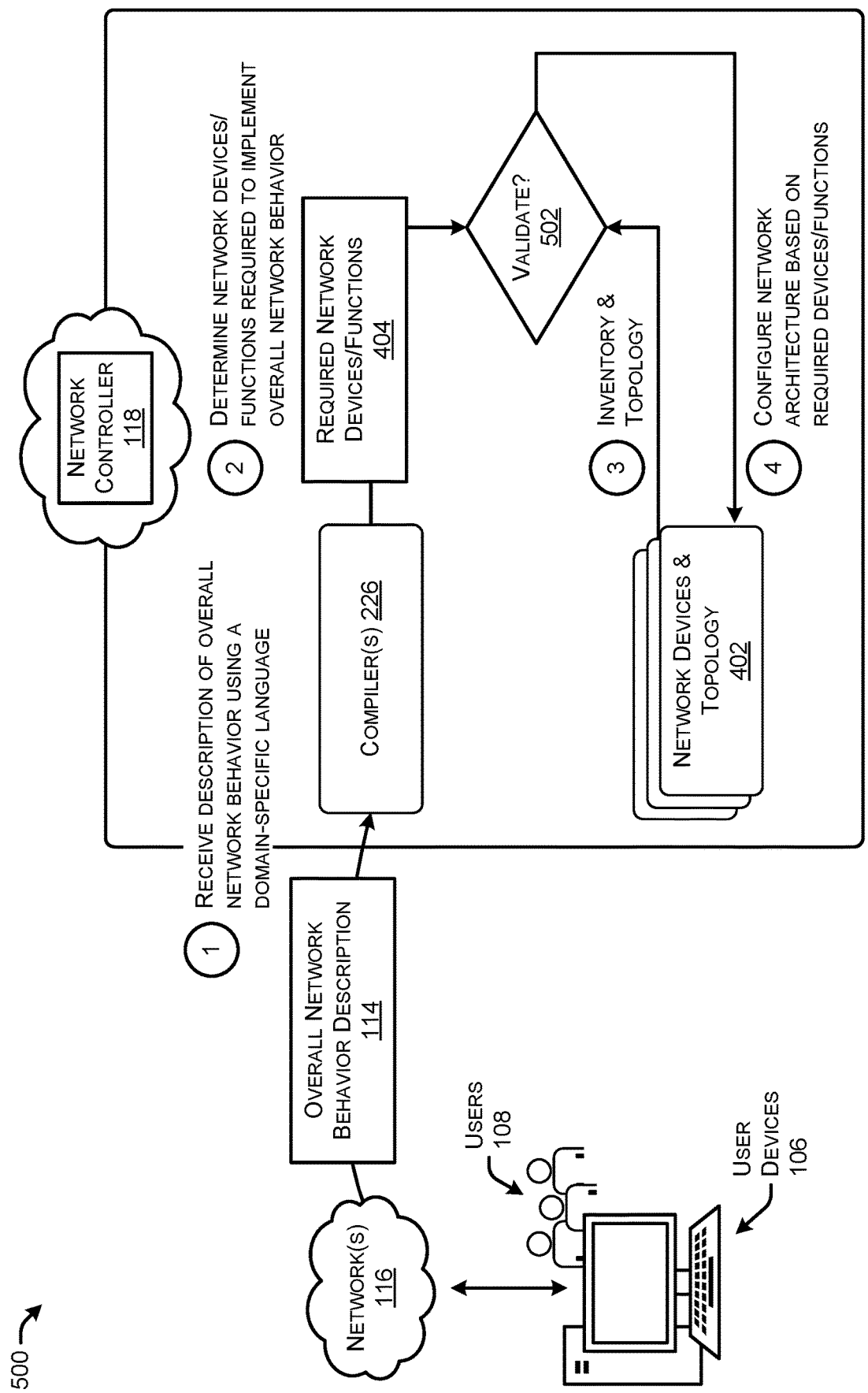
FIG. 5 illustrates a flow diagram of an example method for compiling an overall network behavior description from DSL into executable code, and determining whether an available inventory and/or topology of network devices are able to implement the overall network behavior description.

FIG. 5 illustrates a flow diagram of an example method 500 for compiling an overall network behavior description from DSL into executable code, and determining whether an available inventory and/or topology of network devices are able to implement the overall network behavior description.

At "1," the network controller 118 may receive a description of an overall network behavior that was expressed using a DSL. The DSL code representing the overall network behavior may be provided to the compiler(s) 226 associated with the network controller 118. In this example, the compiler(s) may treat the network architecture 102 as a block box, with language constructs tailored to defining the behavior expected for traffic entering the perimeter of the network under control. For instance, a packet entering at point A in the network architecture 102 may require certain modifications, priority and drop behavior (i.e. traffic engineering) and this could be described by the DSL with no reference to the structure of the intervening network. This allows the user 108 to most clearly express their desire for the overall network behavior and let the compiler 226 programmatically take care of where and how that desire is implemented.

At "2," the compiler(s) 226 may compile the DSL into executable code, which may be one or more different types of executable code, and determine what network devices 112 and functions are required to implement the overall network behavior. For instance, the compiler(s) 226 may be configured to compile the DSL into portions of code 120 that generally represent different network functions (e.g., packet drop, NAT behaviors, packet forwarding, etc.), and the compiler(s) 226 may determine what network devices 122 are required to implement the code 120. In some instances, the DSL may be compiled into code portions 120 of different types of code based on what network device 122 is to execute that portion of the code 120.

At "3," the compiler(s) 226 may obtain inventory data indicating available network devices and/or topology data indicating a topology of a network architecture 102 that is to be used to implement the overall network behavior. The network devices and topology data 402 may be collected or otherwise obtained by the network controller 118. Generally, the network devices and topology data 402 may indicate at least one of an amount of available network devices 122, types of the available network devices 122, locations of the network devices 122 in the network architecture 102, communication links between the network devices 122, and/or other information about the network devices 122.

At decision block 502, the network controller 118 may determine whether the available inventory and topology of the network architecture 102 is valid to support the executable code 120. For instance, the network controller 118 may determine whether the network devices 122 required to implement the overall network behavior are able, or valid, in the network architecture 102.

At "4," the network controller 118 may configure the network architecture 102 based on the required network devices 122 and/or network functions. For example, the network controller 118 may instantiate, configure, reconfigure, or otherwise cause the network devices 122 in the network architecture 102 that are required to implement the overall network behavior to be deployed and arranged in a topology for performing the overall network behavior. The network controller 118 may then deploy the code portions 120 that implement the overall network behavior to the different network devices 122.

Figure 6:
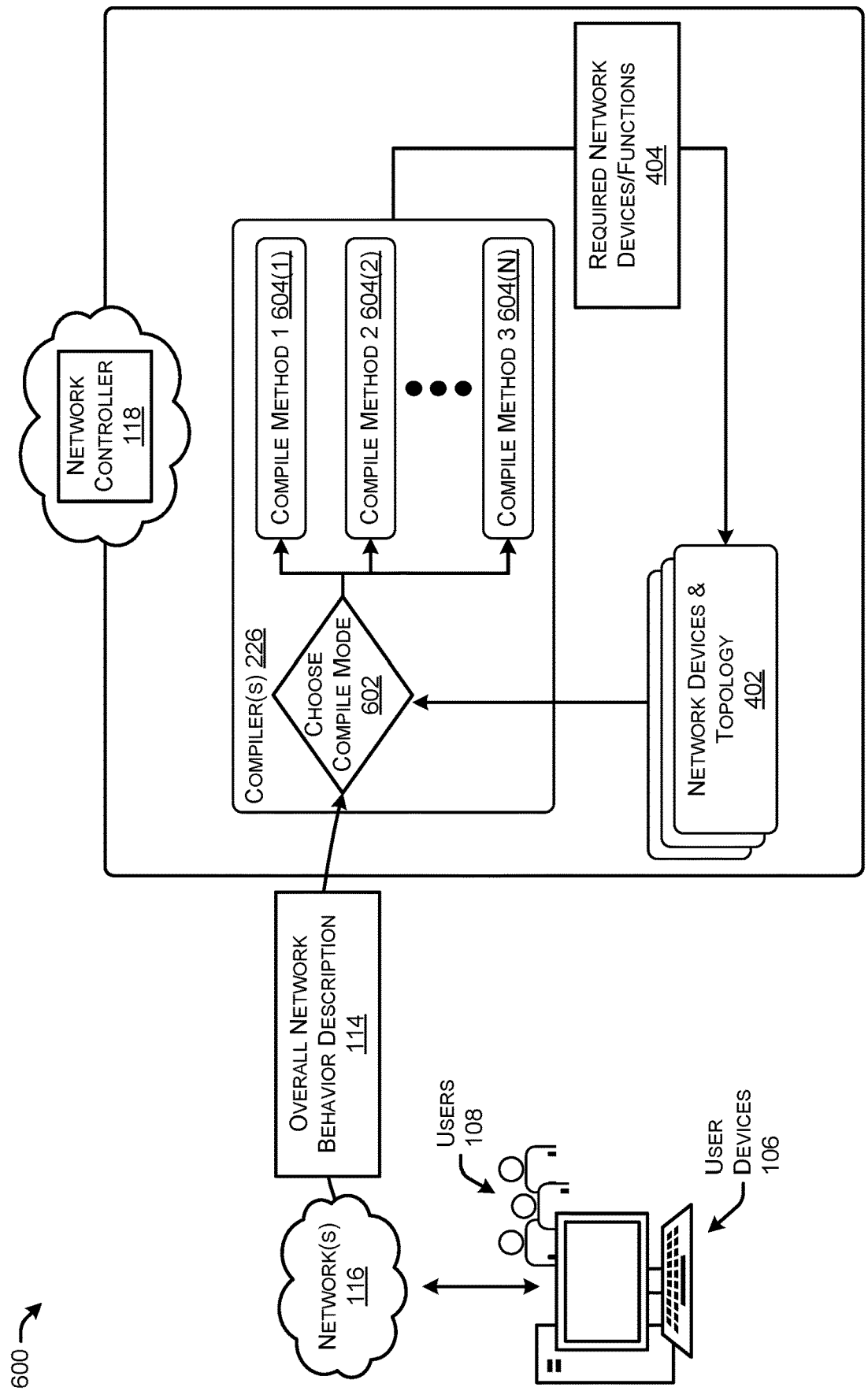
FIG. 6 illustrates a flow diagram of an example method for receiving an overall network behavior description written in a DSL, and selecting a compilation method based on an available inventory and/or topology of network devices to compile into executable code that can be supported by the network architecture.

FIG. 6 illustrates a flow diagram of an example method 600 for receiving an overall network behavior description written in a DSL, and selecting a compilation method based on an available inventory and/or topology of network devices to compile into executable code that can be supported by the network architecture 102.

The network controller 118 may receive a description of an overall network behavior that was expressed using a DSL. The DSL code representing the overall network behavior may be provided to the compiler(s) 226 associated with the network controller 118.

The may further compiler(s) 226 obtain inventory data indicating available network devices and/or topology data indicating a topology of a network architecture 102 that is to be used to implement the overall network behavior. The network devices and topology data 402 may be collected or otherwise obtained by the network controller 118. Generally, the network devices and topology data 402 may indicate at least one of an amount of available network devices 122, types of the available network devices 122, locations of the network devices 122 in the network architecture 102, communication links between the network devices 122, and/or other information about the network devices 122.

The compiler 226 may, at decision block 602, choose a compilation mode 604 based on the overall network behavior description 114 and the network devices and topology 402. For instance, the compiler 226 may determine what network devices and topology is available, and select compilation method(s) 604 that can compile the DSL into executable code 120 that can run on the available devices 122. In this way, the compiler(s) 226 (which may be multiple compilers 226), may compile the DSL into types of code 120 that can be run on the types of network devices 122 and in the network topology that is available in the network architecture 102.

The network controller 118 may configure the network architecture 102 based on the required network devices 122 and/or network functions. For example, the network controller 118 may instantiate, configure, reconfigure, or otherwise cause the network devices 122 in the network architecture 102 that are required to implement the overall network behavior to be deployed and arranged in a topology for performing the overall network behavior. The network controller 118 may then deploy the code portions 120 that implement the overall network behavior to the different network devices 122.

FIGS. 7A and 7B illustrate respective examples of using a DSL to express an overall network behavior description.

In FIG. 7A and FIG. 7B, example interfaces 700 and 708 are presented on a user device 106 through which a user 108 can define an overall network behavior description 114 in a DSL through different portions 702, 704, 706, and 710. The interfaces 700 and 708 have DSL that defines a multi-device network address translation (NAT) connection between multiple virtual routing and forwarding domains (VRFs) in a network architecture 102.

In these examples, "setup_nat" is now a network independent function that can program the functionality into the network. This is an example of the idea that a user 108 can create a function with a DSL like setup_nat in it—and in the 'compilation' phase—the DSL is broken down into individual programming of agents where the behavior now operates using complex rules, but without a DSL. A more extensive construction would have DSL that is used to deal with messaging failures, expiring and removing NAT mappings and so on in the compile phase, and the DSL language may have features to assist with these things (specifically message failure) so that the high-level function of 'this is the network behavior is not the concern of the user 108 since it's taken care of in the 'compile' phase, but the functionality would remain the same in the high level DSL—that intent would be specified. At the DSL level, the user 108 may describe the flow from A_ip to B_ip including additional functionality like TCP optimization or firewalls, but the user 108 is still expressing intent at the network level and it is being reduced by the system to a set of programmatic rules in the devices, ones that may well be a combination of NPU programming and CPU-based packet manipulation code. Thus, the DSL is the concept that a general network-wide description of "this is what I want from the network"— programming language that allows extensive constructs to be made—independent of the make-up of the network to be original.

Figure 8:
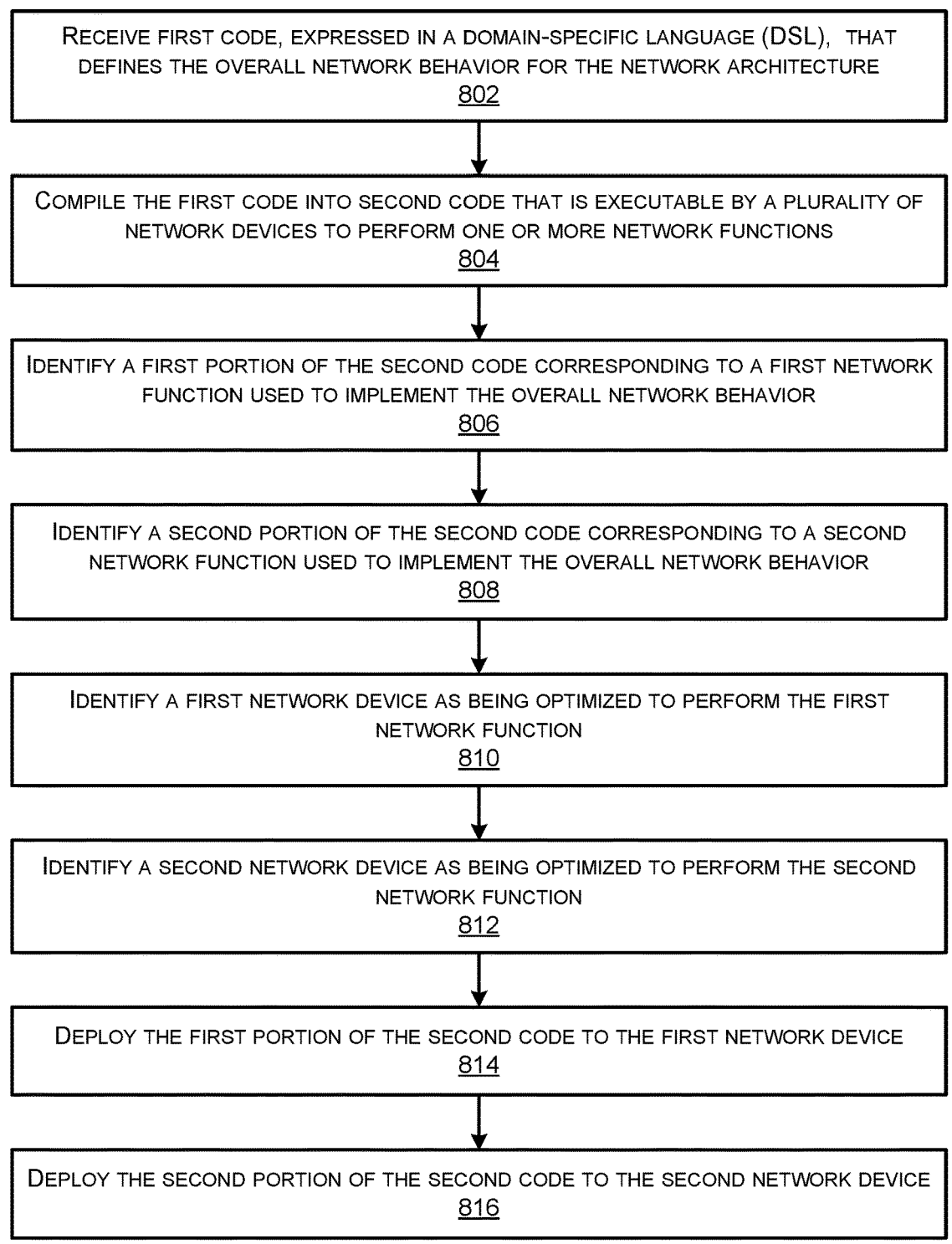
FIG. 8 illustrates a flow diagram of example method for receiving a definition of an overall network behavior for a network architecture described in a DSL, and compiling the DSL into executable code to be run on network devices.

FIG. 8 illustrates a flow diagram of an example method 800 that illustrates aspect of the functions performed at least partly by the devices described in FIGS. 1-7 and 9-15, such as the user device 106, the network controller 118, and so forth. The logical operations described herein with respect to FIG. 8 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 8 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

In some instances, the steps of method 800 may be performed by a device and/or a system of devices that includes one or more processors and one or more non-transitory computer-readable media storing computer-executable instructions that, when executed by the one or more processors, cause the one or more processors to perform operations of method 800.

FIG. 8 illustrates a flow diagram of example method 800 for receiving a definition of an overall network behavior for a network architecture described in a DSL, and compiling the DSL into executable code to be run on network devices. The method includes the user of a domain-specific language (DSL) to define an overall network behavior of a network architecture.

At 802, the network controller 118 may receive first code, expressed in the DSL, that defines the overall network behavior for the network architecture. Generally, the DSL is a network description language usable to define end-to-end network behaviors for network architectures 102. In some instances, a user 108 on a user device 106 may use the DSL (potentially in conjunction with a GPL) to define the overall network behavior that is desired for the network architecture 102.

At 804, the network controller 118 may compile the first code into second code that is executable by a plurality of network devices to perform one or more network functions. The network controller 118 may compile the DSL into executable code 120 based on what network devices 112 are going to execute the code 120. In some instances, multiple different compilers 226 may be used to generate code 120 of different types to run on different network devices 122 and components.

At 806, the network controller 118 may identify a first portion of the second code corresponding to a first network function used to implement the overall network behavior, and at 808, the network controller 118 may identify a second portion of the second code corresponding to a second network function used to implement the overall network behavior. For instance, the network controller 118 may determine that different portions of the code 120 may correspond to different network functions that support the overall network behavior.

At 810, the network controller 118 may identify a first network device as being optimized to perform the first network function, and at 812, the network controller 118 may identify a second network device as being optimized to perform the second network function. For instance, the first and second network devices 122 may be at locations in the network topology, and/or of specific device types, that are optimized for running the respective network functions.

At 814, the network controller 118 may deploy the first portion of the second code to the first network device, and at 816, the network controller 118 may deploy the second portion of the second code to the second network device. For instance, the network controller 118 may send the portions of the code 120 to the respective network devices 112 in order to implement the desired overall network behavior on the network architecture 102.

In some instances, the method 800 further includes obtaining inventory data indicating device types of the network devices in the network architecture, and in such examples, identifying the first network device as being optimized to perform the first network function includes determining, using the inventory data, that the first network device is of a particular device type that is optimized to perform the first network function.

In some instances, the method 800 further includes obtaining topology data indicating a topology of the network devices in the network architecture, and in such examples, identifying the first network device as being optimized to perform the first network function includes determining, using the topology data, that the first network device is at a location in the network optimized to perform the first network function.

In some examples, the method 800 includes, subsequent to compiling the first code into the second code, determining multiple combinations of network device types usable to perform the network functions that implement the overall network behavior, obtaining inventory data indicating device types of the network devices in the network architecture, and determining, using the inventory data, that at least one combination of the multiple combinations of network devices is available in the device types of the network devices in the network architecture.

FIGS. 9-14 generally represent different techniques for using at least a DSL to define overall network behaviors where at least a portion of the overall network behaviors is implemented using one or more serverless network functions.

Figure 9:
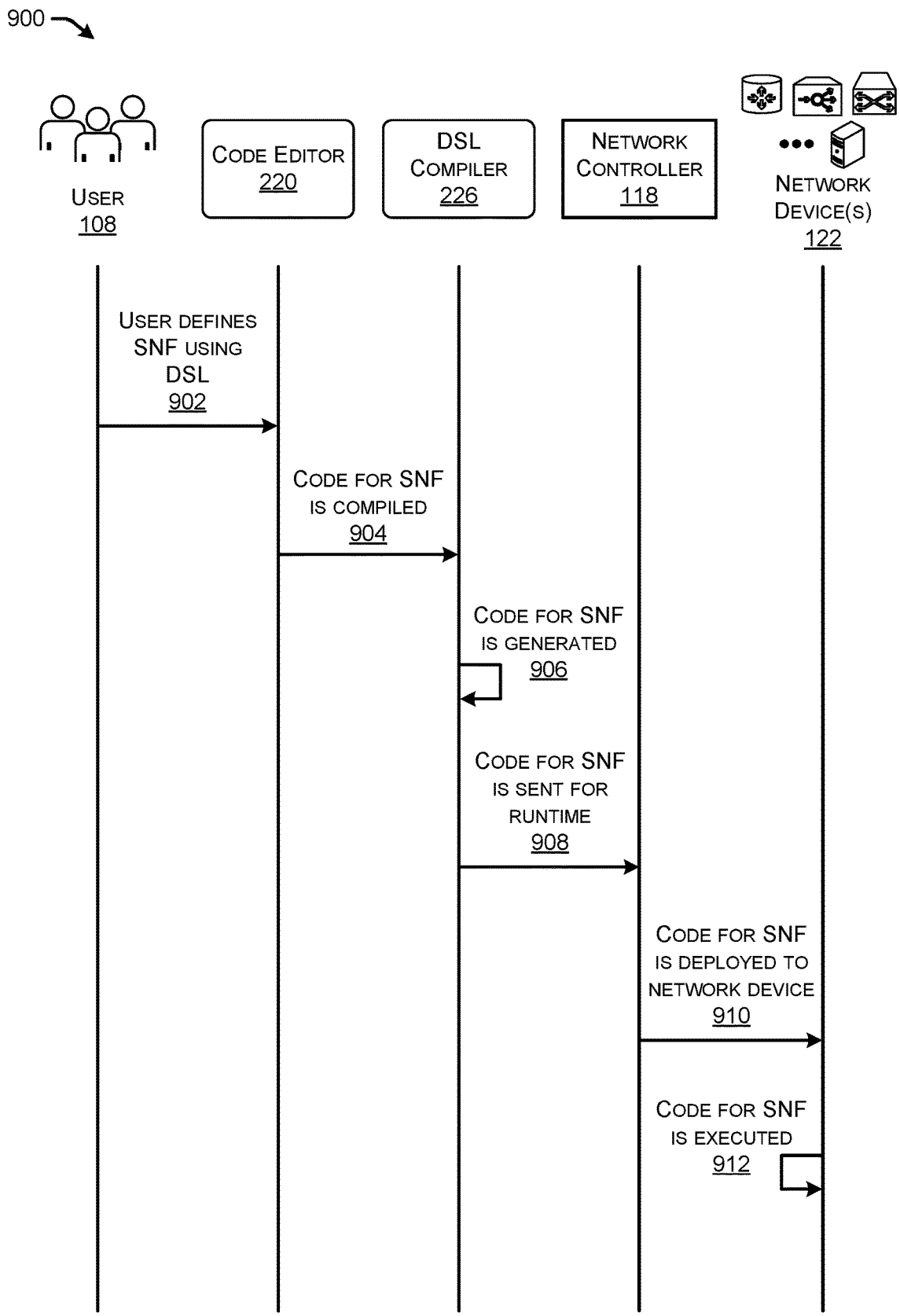
FIG. 9 illustrates a flow diagram of an example method for a user of a user device to express a serverless network function, for a domain-specific language compiler to generate code for executing the serverless network function, and for a network controller to deploy the code of the serverless network function to one or more network devices in a network architecture.

FIG. 9 illustrates a flow diagram of an example method 900 for a user of a user device 106 to express a serverless network function that may be included in an overall network behavior 114, for a domain-specific language compiler 226 to generate code for executing the serverless network function, and for a network controller 118 to deploy the code of the serverless network function to one or more network devices or components in a network architecture 102.

At 902, a user 108 may define a serverless network function using a DSL. For instance, the user 108 may interact with the code editor 220 to input text-based input, graphic-based input, and/or a combination thereof. The code editor 220 may receive the input from the user 108 that expresses or defines the serverless network function of the overall network behavior 114 at least partially in the DSL.

At 904, the overall network behavior 114 that includes the serverless network function may be compiled by the DSL compiler 226. The DSL compiler 226 may compile the source code into any desired target code (or object code). In some instances, the DSL compiler 226 may compile the source code into a target code that is configured to be executed by the destination network component (e.g., a target code may be selected based on a type of code the network component is able to execute). At 906, the DSL compiler 226 may generate code for the SNF. For instance, the DSL compiler 226 may generate target code based on a type of a destination network device.

At 908, the target code for the serverless network function is sent for runtime. More specifically, the user device 106 may send the target code to the network controller 118. The network controller 118 is then tasked with determining a network device on which the serverless network function is to be deployed.

At 910, the network controller 118 determines which network device 122 (or network component 414) on which to deploy the code for the SNF. Various characteristics or criteria may be considered with respect to the serverless network function and the network device 122 in order to identify an optimized network device 122 on which to deploy the code representing the serverless network function. The network controller 118 may then deploy the code for the serverless network function to the network device 122 that has been determined to be optimized for running the serverless network function.

At 912, the code for the serverless network function may be executed by a network component and/or the network device 122. For instance, an event may have occurred that triggered the serverless network function to execute and dynamically perform the network action (e.g., a packet was received at the network device 122 that needed to be acted on).

Figure 10:
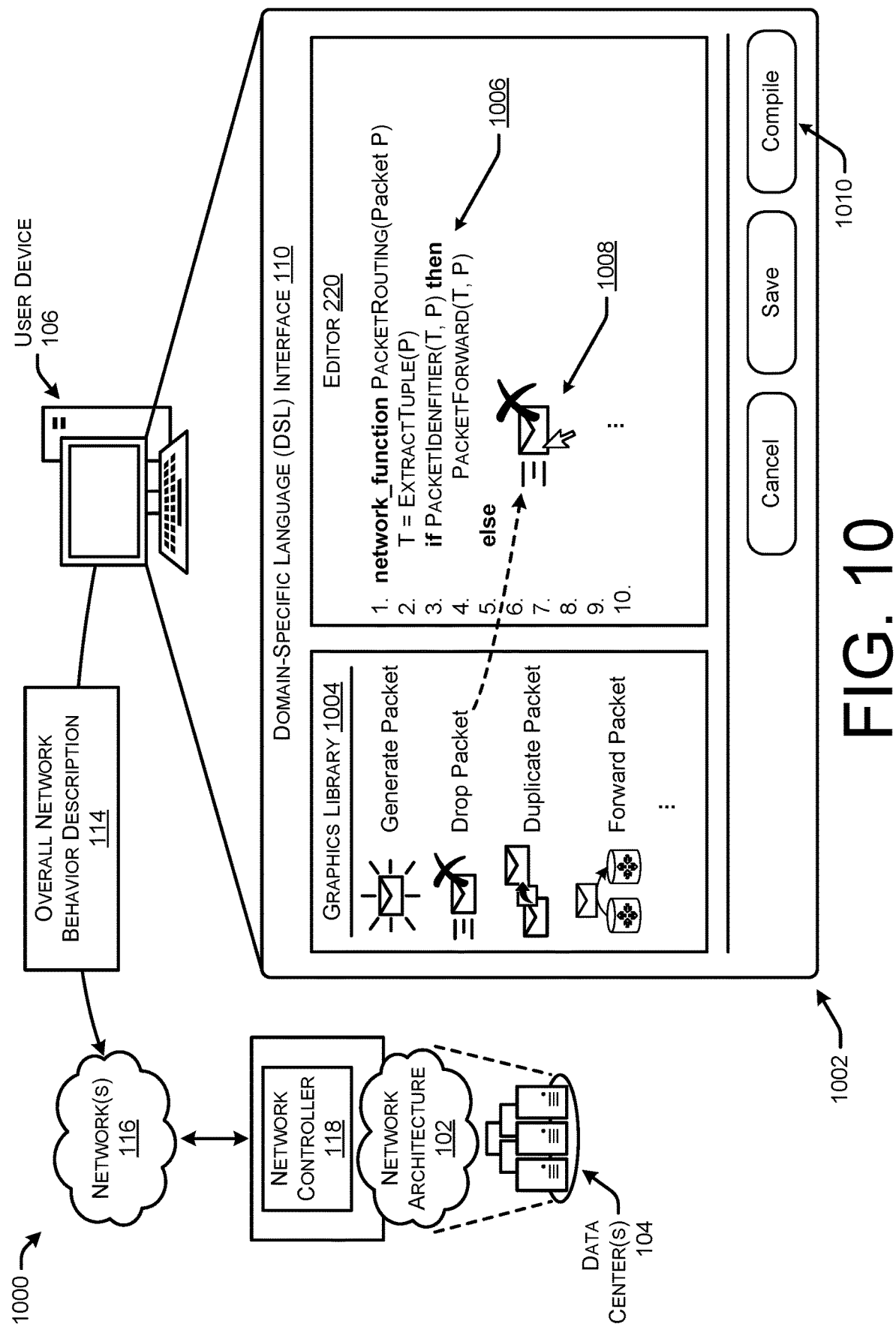
FIG. 10 illustrates a graphical user interface presented on a user device by which a user may express an overall network behavior description using text, graphical icons, and/or a combination thereof.

FIG. 10 illustrates an example environment 1000 in which a graphical user interface (GUI) 1002 is presented on a user device 106 by which a user 108 may express a serverless network function included in a overall network behavior 114 using text, graphical icons, and/or a combination thereof.

As illustrated, the GUI 1002 may present or include the DSL interface 110 through which the user 108 of the user device 106 may express a serverless network function at least partly using a DSL via the editor 220. As noted above, the editor 220 may include a text-based editor 222 and/or a graphic-based editor 224. As illustrated, the DSL interface 110 may include a graphics library 1004 that includes one or more visual graphics or icons that may be used to express at least a portion of a serverless network function. The graphics that are shown in the graphics library may be used to express a serverless network function in the DSL such that the graphics are able to be analyzed and compiled by the DSL compiler(s) 226 and used to generate object code 236.

Accordingly, the DSL may be at least partly a visual programming language when serverless network functions may be at least partly defined using visual graphics or icons. As illustrated, there may be graphics in the graphics library 1004 that represent different network operations, actions, and/or functions, such as a generate-packet graphic, a drop-packet graphic, a duplicate-packet graphic, a forward-packet graphic, and so forth. However, any types of functions or actions may be represented using a graphic icon, and these are merely illustrative examples. For instance, there may be graphics that represent more granular portions of source code that may be utilized (e.g., code functions, code variables, etc.).

As further illustrated, the DSL interface 110 may include a portion to receive text to express a serverless network function in a DSL. The text portion 1006 illustrated is merely an example using pseudo code, and the DSL may be a specialized programming language that is used for the purpose of expressing and creating serverless network functions that execute to perform networking functions. The DSL may comprise a formal programming language comprising a set of instructions that produce a desired result. For instance, the DSL may be a programming language written in an imperative form (e.g., sequence of operations to perform), a declarative form (e.g., the desired result is specified), and/or another form. Generally, the DSL may be a programming language that has syntax (or form) as well as semantics (or meaning), and may be defined by a standard or specification (e.g., the C programming language is specified by an ISO Standard). Further, the DSL may have various built-in libraries, functions, APIs, and so forth.

As illustrated, a user 108 of the user device 106 may input a text portion 1006 as well as a graphic portion 1008 to express a serverless network function in the DSL. In some instances, the graphic portion 1008 may be toggled back-and-forth between an icon and text that corresponds to the icon. In this way, a user 108 may utilize a graphic/icon from the library 1004 and quickly toggle to text to finalize the piece of code. Thus, the editor 220 may allow users 108 to express serverless network functions in a DSL that supports text-based input, graphical/icon-based input, and/or a combination thereof. In the illustrated example, the text input 1006 may indicate a function for packet routing that routes a packet along a particular path if the packet is identified, and otherwise drops the packet as indicated by the graphic 1008 used in the else statement. Again, this is merely an illustrative example and the DSL may be expressed or defined by any semantics or syntax.

OpenFlow is an example of a control plane protocol that is utilized by network controllers. An illustrative example of using the DSL language and mapping into an OpenFlow action set is explained below. However, similar patterns emerge when using languages such as P4, eBPF, and so forth.

Packet acquisition: Packet acquisition may be accomplished by creating a port on an OpenFlow switch such that traffic of a certain pattern could arrive to this port. The equivalent OpenFlow action is OFPT_PACKET_IN.

Packet generation: Packet generation may involve using an OpenFlow port on a switch to allow the DSL to generate packets which come out of this port. The equivalent OpenFlow action is OFPT_PACKET_OUT.

Packet duplication: Packet duplication may be accomplished in that the DSL allows for OFPT_PACKET_IN to receive a packet, and then the DSL itself would generate code to copy this packet.

Packet modification: Packet modification may involve using the DSL to allow for OFPT_PACKET_IN to receive a packet, and then allow for packet modification via some generated code. This could also use OFPT_FLOW_MOD to allow this on a per-flow basis.

Packet drop: Packet drop may involve using the DSL, to setup an OFPT_TABLE_MOD to setup a drop for a packet type specified by the user through the DSL.

Packet forwarding down a specific link: Packet forwarding may involve using an OFPT_TABLE_MOD to allow for a specific packet type to be sent somewhere.

Figure 11:
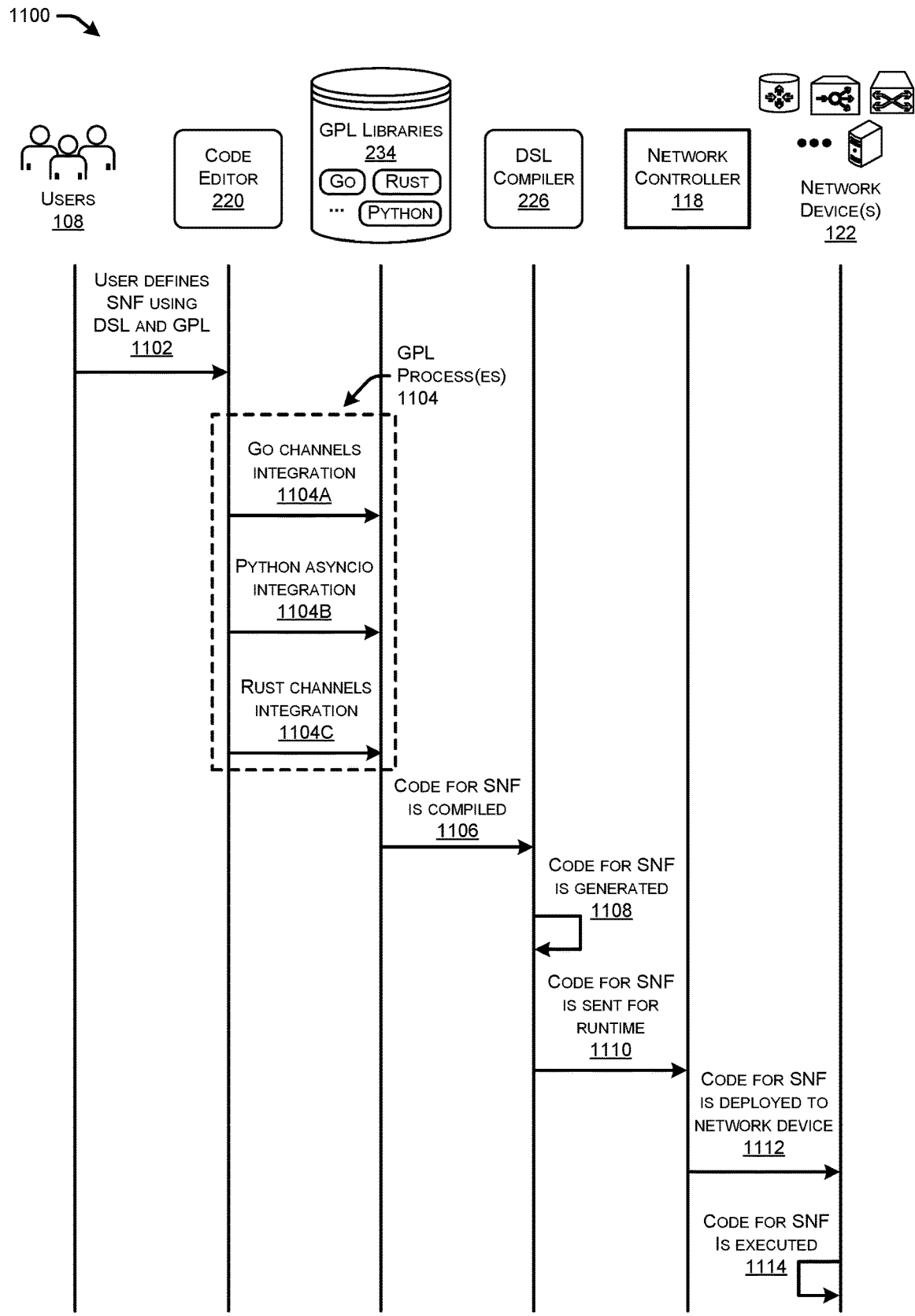
FIG. 11 illustrates a flow diagram of an example method for a user of a user device to express an overall network behavior description using a domain-specific language as well as a general-purpose language, for a compiler to generate code for executing the an overall network behavior description, and for a network controller to deploy the code of the an overall network behavior description to network devices in a network architecture.

FIG. 11 illustrates a flow diagram of an example method 1100 for a user 108 of a user device 106 to express a serverless network function using a domain-specific language as well as a general-purpose language, for a compiler to generate code for executing the serverless network function included in, or supporting, an overall network behavior 114, and for a network controller to deploy the code of the serverless network function to one or more network devices in a network architecture.

At 1102, the user 108 may define a serverless network function using a DSL as well as a GPL. The GPL may comprise any type of GPL usable to define network functions, such as a Go programming language, a Rust programming language, a Python programming language, a P4 programming language, an OVSDB programming language, and/or any other language that is usable to define network functions.

At 1104, the code editor 220 may initiate one or more GPL processes 1104 based on the GPL being used in combination with the DSL. For instance, if the user 108 is writing their code using Go language, the code editor 220 would use channels to integrate between hardware/software at 1104A. Further, if the user 108 is writing their code in python, the code editor 220 would use asyncio to integrate between hardware/software at 1104B. Additionally, if the user 108 is writing their code using Rust, the code editor 220 would use Rust channels to integrate between hardware/software at 11040. As another example, if the user 108 is writing their code in PHP, the editor 220 would map their code using a normal PHP model.

Because the editor 220 and the compiler(s) 226 are configured to know the nature of the DSL and the GPI, they can use that knowledge to find the most efficient way to make the components interact, which is specific to both the nature of the network code and its implementation and to the features of the GPL in use. The low level connection may be further refined by adding a presentation layer in the GPL (for instance, if using Golang channels to feedback information from an NPU by enabling a go thread to probe the NPU and return data, but we cap the channel on the Golang program side with an object that reads the data, interprets it and makes callbacks).

In some examples, channels and asyncio may be used for creating filter paths (e.g. punt paths). Channels and asyncio may be used for various functions, such as Data Over Cable Service Interface Specification (DOCSIS) control messages. IPsec IKE messages, BGP control plane messages, etc. Further, channels and asyncio may be used for various events that may trigger serverless network functions, such as detecting and enforcing thresholds, rate limits, new packet detection, and so forth. Even further, channels and asyncio may be used for logging, such as logging a current packet and history that makes a packet interesting.

At 1106, the source code representing the serverless network function may be compiled into a target code by the DSL compiler 226, and at 1108, the DSL compiler 226 may generate the target code for the serverless network function. The source code may be generated or compiled into a target code that is in a language that is executable on the destination network component. Thus, the network controller 118 may determine a network component on which to deploy the serverless network function based at least in part on the network component being capable to execute the target code.

At 1110, the code may be sent from the DSL compiler 226 to the network controller 118 for runtime. At 1112, the network controller 118 may identify an optimal network component on which to execute the serverless network function, and deploy the target code of the serverless network function to the network component. At 1114, the code for the serverless network function may be executed by the network component 414.

Figure 12A:
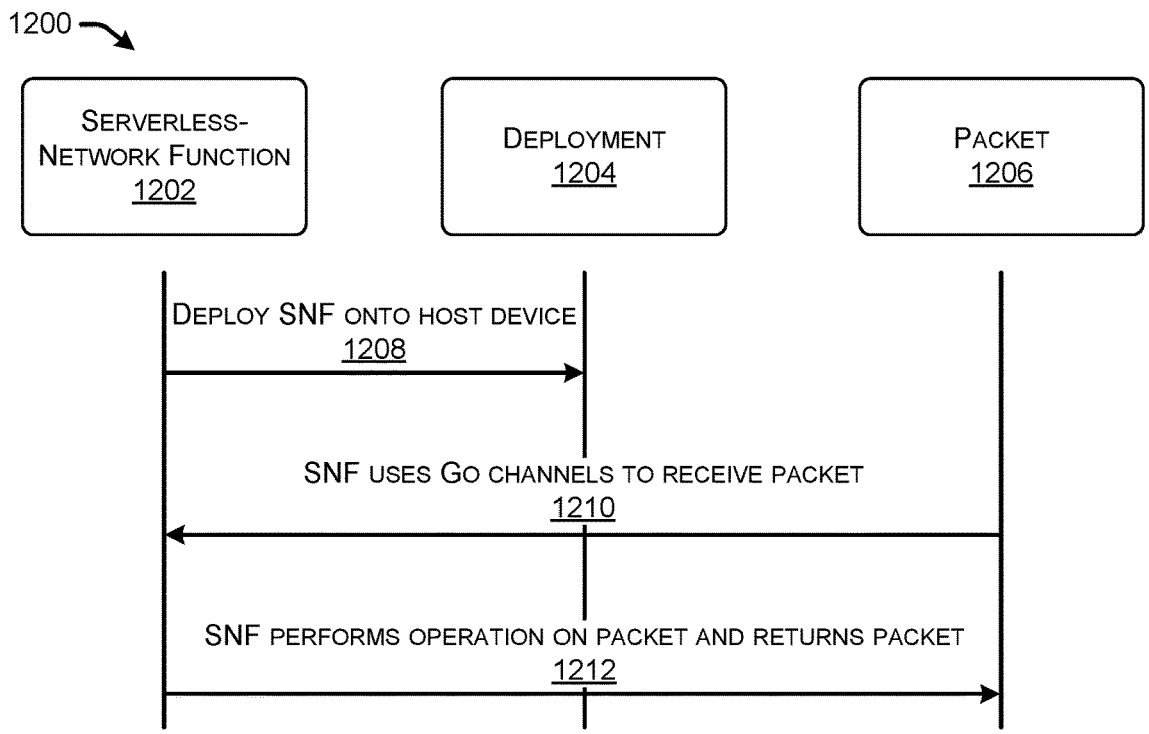
FIGS. 12A and 12B illustrate respective flow diagrams of an example method for a user of a user device to express an overall network behavior description using a domain-specific language as well as a general-purpose language, for a compiler to generate code for executing the overall network behavior description, and for a network controller to deploy the code of the code to network devices in a network architecture. More specifically.
Figure 12B:
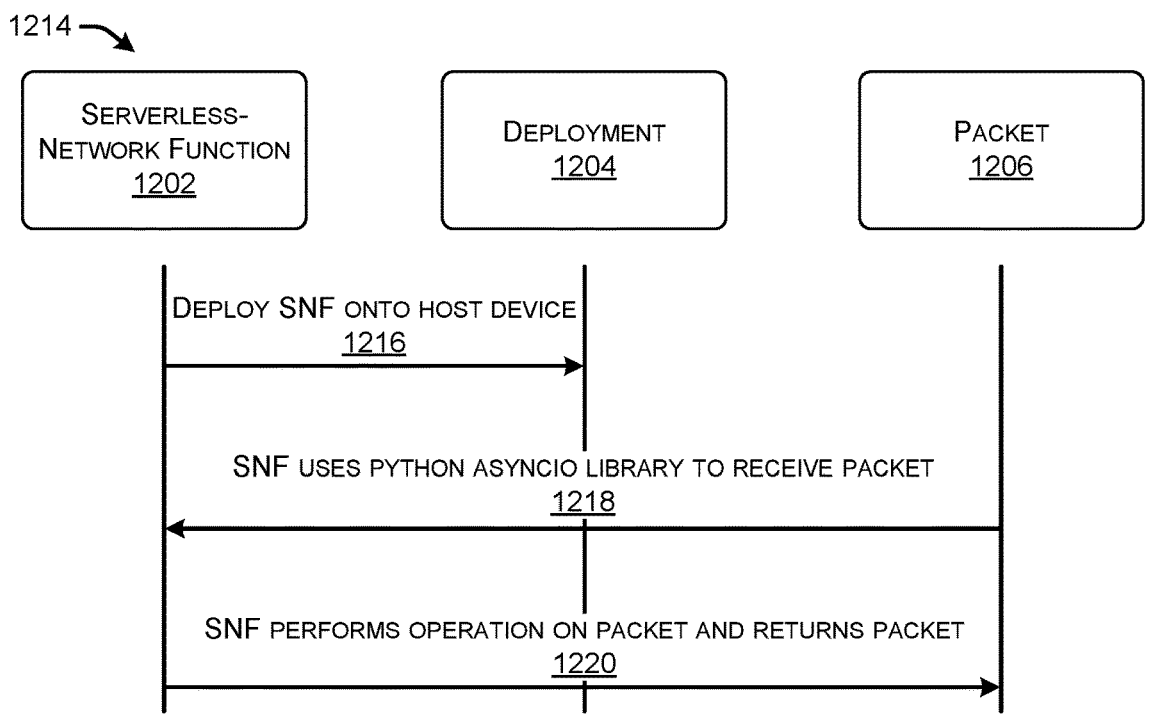

FIGS. 12A and 12B illustrate respective flow diagrams of example methods for a user 106 of a user device 108 to express a serverless network function, included in or supporting, an overall network behavior 114 using a domain-specific language as well as a general-purpose language, for a compiler to generate code for executing the serverless network function, and for a network controller to deploy the code of the serverless network function to one or more network devices in a network architecture. More specifically, FIG. 12A illustrates expressing a serverless network function using the domain-specific language as well as at least one of a Go programming language or a Rust programming language, and FIG. 12B illustrates expressing a serverless network function using the domain-specific language as well as a Python programming language.

Flow diagram 1200 of FIG. 12A illustrates an example method of a serverless network function 1202 executing on a network component where the serverless network function is expressed using a DSL as well as a GPL, such as Go language. As illustrated, the serverless network function 1202 may move to the deployment state at 1204. For instance, the network controller 118 may, at 1208, deploy code of the serverless network function (e.g., source code, target code, etc.) onto a host device, or a network component as described herein. A packet 1206 may be sent to the host device. In such examples, the serverless network function may use a Go channel, at 1210, to receive the packet 1206. That is, the Go channel provides an interface between the serverless network function written at least partly using the DSL and the hardware layer where the packet 1206 is received. At 1212, the serverless network function may perform an operation on the packet and return the packet 1206, such as duplicating the packet 1206, modifying the packet 1206, and/or any other function.

Flow diagram 1214 of FIG. 12B illustrates an example method of a serverless network function 1202 executing on a network component where the serverless network function is expressed using a DSL as well as a GPL, such as Python. As illustrated, the serverless network function 1202 may move to the deployment state at 1204. For instance, the network controller 118 may, at 1216, deploy code of the serverless network function (e.g., source code, target code, etc.) onto a host device, or a network component as described herein. A packet 1206 may be sent to the host device from another device. In such examples, the serverless network function may use the Python asyncio library, at 1218, to receive the packet 1206. That is, the asyncio library provides an interface between the serverless network function written at least partly using the DSL and the hardware layer where the packet 1206 is received. At 1220, the serverless network function may perform an operation on the packet and return the packet 1206, such as duplicating the packet 1206, modifying the packet 1206, and/or any other function.

Figure 13:
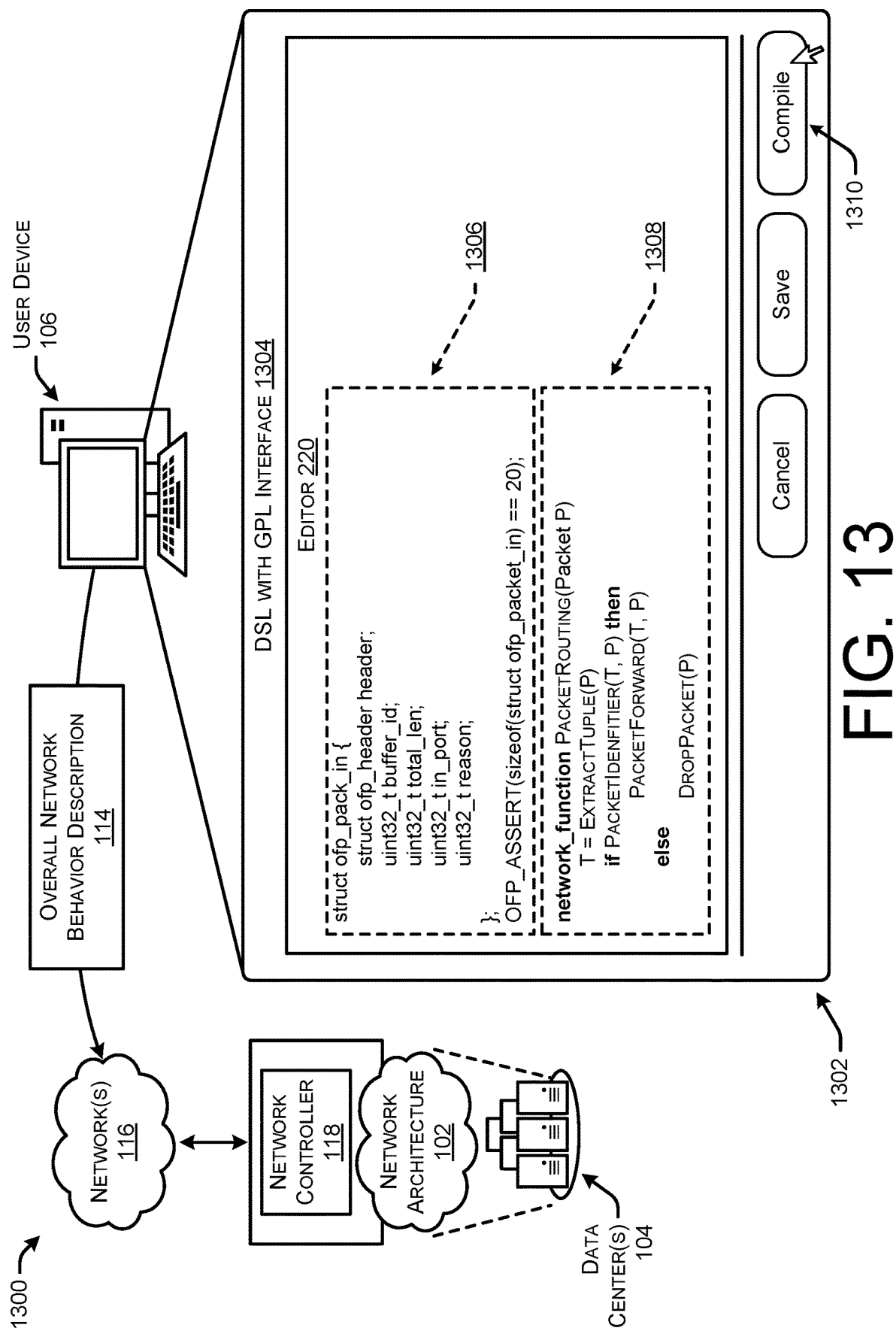
FIG. 13 illustrates a graphical user interface presented on a user device by which a user may express an overall network behavior description using a combination of a domain-specific language and a general-purpose language.

FIG. 13 illustrates an example environment 1300 in which a graphical user interface (GUI) 1302 is presented on a user device 106 by which a user 108 may express a serverless network function using a combination of a domain-specific language and a general-purpose language.

As illustrated, the GUI 1302 may present or include the DSL with GPL interface 1304 through which the user 108 of the user device 106 may express a serverless network function at least partly using a DSL and at least partly using a GPL via the editor 220.

As noted above, the techniques described herein may include using a combination of the DSL and a GPL to express and create serverless network functions. For instance, by knowing the nature of the DSL and GPL(s), the techniques described herein include compiling source code written using a combination of DSL and GPL into code (such as object code or other machine code) that is executable to perform one or more serverless network functions. The GPL may comprise any type of GPL usable to define network functions, such as a Go programming language (often referred to as "Golang"), a Rust programming language, a Python programming language, a P4 programming language, an OVSDB programming language, and/or any other language that is usable to define network functions.

As illustrated in FIG. 13, the interface 1304 allows a user 108 to provide input to the editor 220 using a GPL language as well as the DSL language. In the illustrated example, the user 108 has input a GPL portion 1306 and a DSL portion 1308 in order to define one or more serverless network functions. The GPL portion 1306 in this example is an OpenFlow programming language, but the GPL may be any language (e.g., Python, Go language, etc.).

In some instances, the DSL and GPL may integrate such that the different languages represent different components of one or more serverless network functions. For instance, the DSL and GSL portions 1306/1308 of the serverless network function(s) may integrate using built in connections. For instance, a component may be expressed in the DSL, and a component may be expressed in a GPL, such as Rust or Golang, and the DSL and GPL may interface or interact using channels (e.g., asynchronous channels). That is, Rust channels and Golang channels may be used as pipes to connect concurrently running components, such as a DSL-based component and a GPL-based component. In another example where the GPL is a Python language, the DSL-based component and a GPL-based component may be connected using the asyncio library (e.g., a set of high-level APIs, low-level APIs, etc.)) which is utilized to connect the asynchronous components.

In some instances, the DSP and GPL may integrate according to other techniques. For instance, the DSL may be designed to allow GPL code to be embedded into the DSL code and compiled (or transpiled) into a combined piece of code. Alternatively, the DSL may be configured such that the DSL code may be able to be embedded into GPL code and compiled (or transpiled) into a combined piece of code. The compiler 226 may be configured to ensure that the resulting code is a combination of the functionality expressed in DSL and the functionality expressed in GPL, as well as the cross-link between the portions of the resulting code expressed in the different languages. By combining the DSL with a GPL, the user 108 is provided the benefit of being able to use the DSL to succinctly express a serverless network function, and also provided the benefit of being able to use a GPL, which the user may be familiar with, to express a portion of the serverless network function. The compiler 226 may be configured to identify which portions of the code are written in the DSL versus GPL (e.g., identify semantics, identify syntax, etc.), and ensure that the portions of the code are appropriately compiled into a desired piece of output code.

Once the user 108 has finished expressing a serverless network function via the editor, using the DSL in conjunction with a GPL, the user may select the compile option 1310 to cause a compiler 226 to compile the code into a desired target code. The target code 120 that represents the serverless network function may then be sent to a network controller 118 that manages the network architecture 102 in which the serverless network function is to be deployed. The network controller 118 may be configured to determine a network component on which the serverless network function is to be deployed. The network controller 118 may determine an optimized placement for the serverless function to execute, or network component in the network architecture on which to run the serverless network function.

Figure 14:
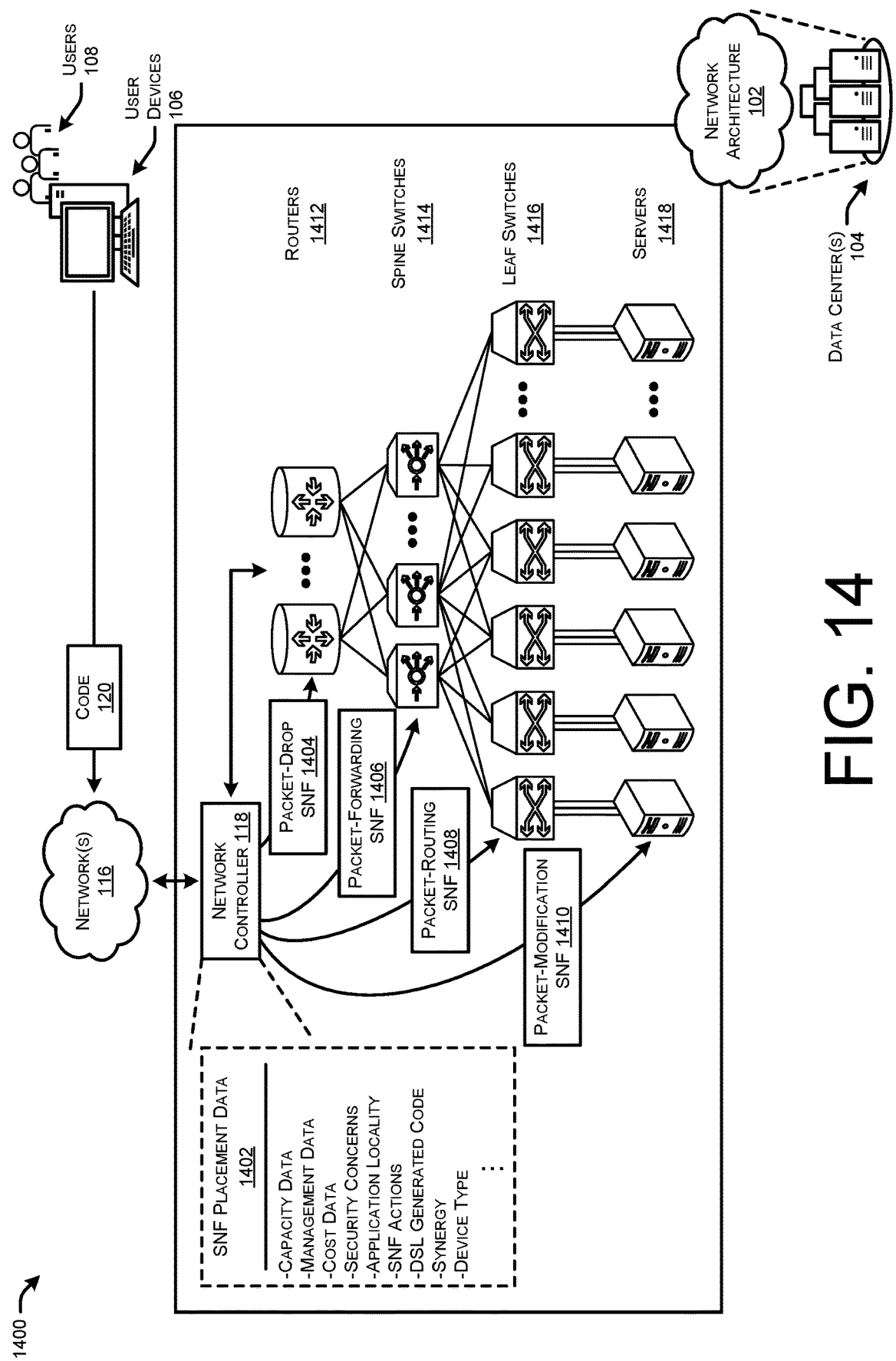
FIG. 14 illustrates a system-architecture diagram of an environment in which a network controller in a network architecture deploys a serverless network function at an optimal location (e.g., on an optimal network component or device) in the network architecture.

FIG. 14 illustrates a system-architecture diagram of an environment 1400 in which a network controller 118 in a network architecture deploys a serverless network function at an optimal location (e.g., on an optimal network component or device) in the network architecture 102.

The network controller 118 may manage the network architecture 102, and maintain data regarding the state and layout of the network architecture 102. The controller 118 may utilize this information and data to determine a location, or a network component/device, on which to deploy the serverless network functions. That is, the controller 118 may determine a network component that has characteristics which are optimal for executing the serverless network function based on a type or characteristic of the serverless network function.

The network controller 118 may be configured to evaluate various criteria, characteristics, data, information, etc., to determine an optimal network component in the network architecture 102 at which to place a serverless network function. The network controller 118 may consider criteria, characteristics, data, etc., around at least the serverless network function and the network components. For instance, the network controller 118 may utilize various SNF placement data 1402, such as capacity data, management data, cost data, security concerns, application locality, SNF actions, DSL generated code, synergy data, device type, and so forth.

With respect to capacity data 1402, the network controller 118 may collect and/or analyze telemetry data indicating an availability of one or more computer resources of network components in the network architecture 102 (e.g., compute resources, storage resources, networking resources, memory resources, etc.). In such examples, the network controller 118 may determine to deploy a serverless network function to a network component that has excess resource capacity, or at least sufficient availability of resources, to host the serverless network function. In some instances, the network controller 118 may determine an optimized network component on which to deploy the serverless network function based on a primary resource type consumed by the serverless network function, and the availability of resources of the network components. For instance, a serverless network function that maintains a routing table may be deployed to a network component with excess memory, and a serverless network function that does packet processing may be deployed to a network component with excess computing resources. The network controller 118 may determine, for instance, a host capacity (e.g., how much is running on potential hosts/network components), a SmartNIC capacity (e.g., how may programs are on the SmartNIC and how full are its tables), a router capacity (e.g., how much can the router handle with respect to running programs), etc. With respect to management data 1402, the network controller 118 may determine a difficulty associated with managing the network component that is running the serverless network function. For instance, the network component may be at least partially out of the control of the network controller 118, or be configured to perform operations that the controller 118 does not have control over.

With respect to the cost data 1402, the network controller 118 may take into account cost for running a serverless network function on different network components. For instance, it may cost more to run a serverless network function on a host device versus a SmartNIC or a router. In some instances, a compute node may be running low on memory, and it may cost more to run the serverless network function on that compute node. As another example, a SmartNIC may be running as the host (e.g., too much traffic), so the serverless network function may be placed on a different network component/host. Thus, the network controller 118 may have insight into the cost data 1402 for running a serverless network function on the network components, and select an optimized network component to run a serverless network function based on a lower cost relative to other network components capable of running the serverless network function.

With respect to the security concerns, the network controller 118 may take into account security concerns with running the serverless network function. For instance, the network controller 118 may determine whether the serverless network function is trusted to run on various network components. For instance, based on the functions the serverless network function is performing, as compared to the data and or functions being performed by the network components, the network controller 118 may determine whether or not to deploy the serverless network function to the network components based on security concerns.

With respect to the application locality for optimizing placement of a serverless network function, the network controller 118 may monitor or otherwise determine software locality for various software functions, such as applications being hosted in a Software-as-a-Service (SaaS) environment. In such examples, the network controller 118 may further determine that the serverless network function is configured to be attached to a specific SaaS compute function and perform a serverless network function specific to that SaaS compute function. In such examples, the network controller 118 may determine to deploy the serverless network function on a same host as, or on a neighboring host to, the SaaS compute function to work seamlessly in conjunction with the SaaS compute function.

With respect to the serverless network function actions, the network controller 118 may determine a type of the serverless network function (e.g., what action or actions does the serverless network function perform), and place the serverless network function. The network controller 118 may maintain a model or other representation of a layout or architecture of the network architecture 102 that the network controller 118 is managing. This may include locations of network components in the network architecture 102 (e.g., near the edge of the network, near application servers, etc.), and/or functions of different network devices in the network architecture 102 (e.g., firewall components, routing components, etc.). The network controller 118 may determine locations at which to deploy serverless network functions based on a location and/or functionality of network components.

As an example, the network controller 118 may determine that a serverless network function is a packet-drop SNF 1404. In such examples, the network controller 118 may determine that an optimized location for the packet-drop SNF 1404 would be on a router 124, or on another network component that is near the edge of the network architecture 102. In this way, packets that are dropped do not need to flow through as many devices of the network architecture 102, thereby reserving resources, but may instead be dropped at the edge of the network architecture 102. Additionally, the packet-drop SNF 1404 may run efficiently on the router 124 at least because the router 120 may be able to efficiently drop packets in hardware (as software drops are more expensive).

For some other examples, the network controller 118 may determine to place a packet-forwarding SNF 1406 on a spine switch 126, place a packet-routing SNF 1408 on a leaf switch, and/or place a packet-modification SNF 1410 on a server 128. The network controller 118 may determine that these network components are optimized based on their location in the network architecture, or based on the actions they perform in the network architecture 102, to execute particular serverless network functions. Further, the packet-modification SNF 1410 may be optimized to run on a server 128 or a SmartNIC.

Further, with respect to the DSL generated code 1402, the network controller 118 may determine a type of code of the serverless network function, and determine a network component that is capable or optimized to execute the type of code. For instance, the SNF may compile into a code such as an OpenFlow programming language program, a P4 programming language program, a Linux eBPF program, a program configured to execute on a SmartNIC, a hardware description language associated with at least one of an FPGA or an ASIC, a Vector Packet Processor (VPP) program, and/or any other target code or source code. The network controller 118 may select a network component that is capable, or optimized (e.g., run efficiently), to execute the serverless network function based on a type of code of the serverless network function.

Further, the network controller 118 may determine to place a serverless network function on a network component that has synergy with the type of the serverless network function. For instance, the network controller 118 may determine that it is more efficient to run the SNF close to some other network component of the network architecture 102 due to, for instance, the availability of in-memory packet transport The network controller 118 may determine a network component that is optimized to run the serverless function, and to deploy the serverless network function to, based on one or more (either individually or in combination) of the SNF placement data discussed herein.

Further, the network controller 118 may deploy the SNF code 120 and have one or more mechanisms by which to deploy the SNF code 120. For instance, when deploying the SNF code 120 onto a host itself (e.g. on a Linux bridge, an Open vSwitch switch, eBPF, VPP, etc.), the network controller 118 may simply load the generated code onto the host. The SNF code 120 as generated may dictate the backend target network component, thus constraining the placement. In some instances, an SSL connection may be used to load the SNF code 120 onto the optimized network component.

Once the SNFs are deployed, the network controller 118 may monitor the SNFs to ensure they are performing well. This may include gaining telemetry data from the SNFs and/or hosts, and the telemetry data may allow the network controller 118 to ensure the SNFs are running within operational parameters. The DSL which generates the functions could also put in some boilerplate could around this telemetry, thus allowing it to be easily consumed by the network controller 118, and closing the loop around monitoring the SNF when running in production.

In some examples, the SNFs may be auto-scaled. For instance, the DSL can place some auto-scaling bits inside the generated code, and the network controller 118 can use that to handle auto-scaling in concert with the deployment option. This means that when an SNF hits certain thresholds around things such as bandwidth, CPU usage, etc., it could automatically scale. This would be done by using the telemetry data from the monitoring situation above. Autoscaling of SNFs can be performed in this way.

Figure 15:
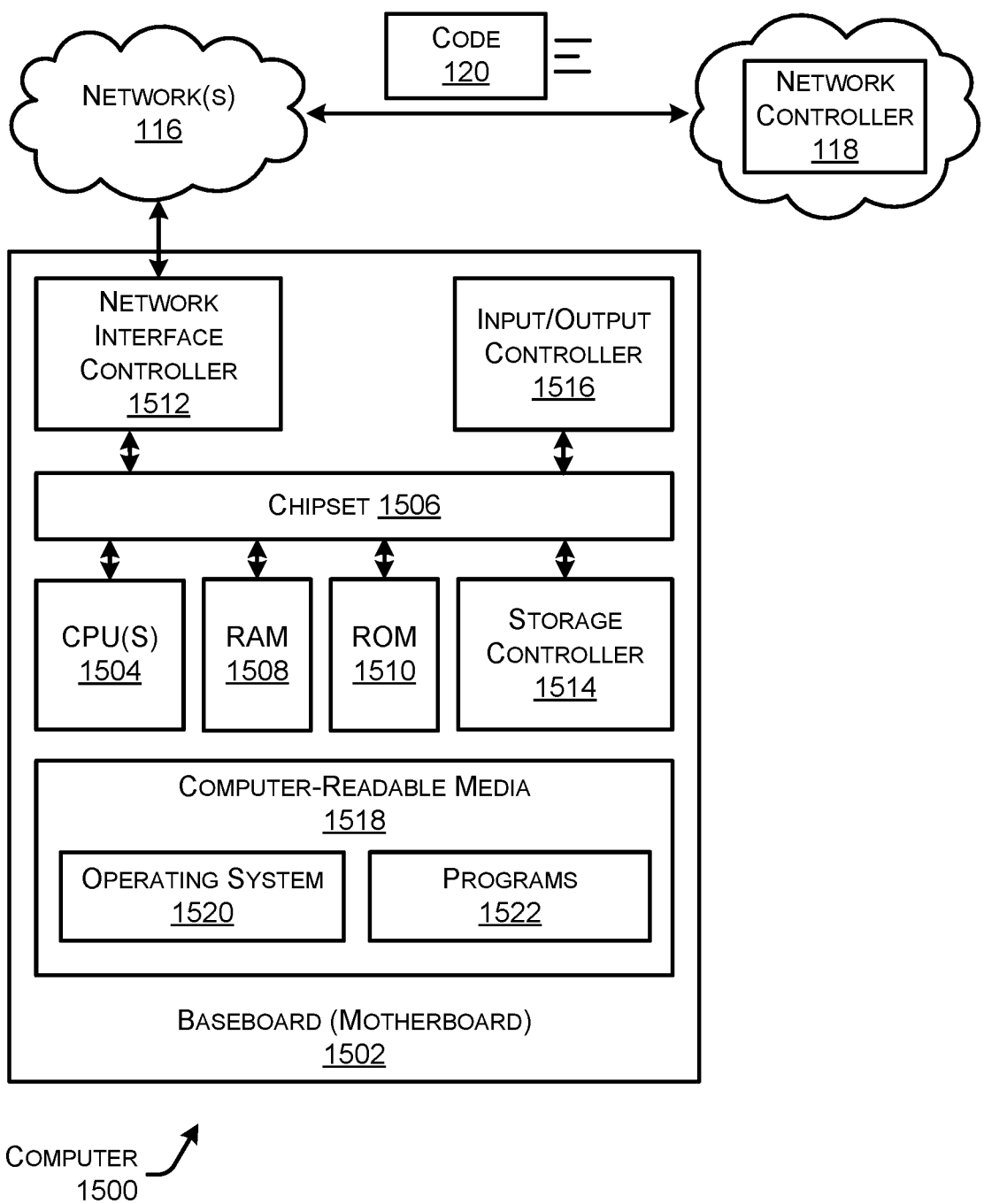
FIG. 15 is a computer architecture diagram showing an example computer architecture for a device capable of executing program components that can be utilized to implement aspects of the various technologies presented herein.

FIG. 15 shows an example computer architecture for a device capable of executing program components for implementing the functionality described above. The computer architecture shown in FIG. 15 illustrates any type of computer 1500, such as a conventional server computer, workstation, desktop computer, laptop, tablet, network appliance, e-reader, smartphone, or other computing device, and can be utilized to execute any of the software components presented herein. The computer 1500 may, in some examples, correspond to a user device 106, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 1500 includes a baseboard 1502, or "motherboard," which is a printed circuit board to which a multitude of components or devices can be connected by way of a system bus or other electrical communication paths. In one illustrative configuration, one or more central processing units ("CPUs") 1504 operate in conjunction with a chipset 1506. The CPUs 1504 can be standard programmable processors that perform arithmetic and logical operations necessary for the operation of the computer 1500.

The CPUs 1504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1506 provides an interface between the CPUs 1504 and the remainder of the components and devices on the baseboard 1502. The chipset 1506 can provide an interface to a RAM 1508, used as the main memory in the computer 1500. The chipset 1506 can further provide an interface to a computer-readable storage medium such as a read-only memory ("ROM") 1510 or non-volatile RAM ("NVRAM") for storing basic routines that help to startup the computer 1500 and to transfer information between the various components and devices. The ROM 1510 or NVRAM can also store other software components necessary for the operation of the computer 1500 in accordance with the configurations described herein.

The computer 1500 can operate in a networked environment using logical connections to remote computing devices and computer systems through a network, such as the network 116. The chipset 1506 can include functionality for providing network connectivity through a NIC 1512, such as a gigabit Ethernet adapter. The NIC 1512 is capable of connecting the computer 1500 to other computing devices over the network 116. It should be appreciated that multiple NICs 1512 can be present in the computer 1500, connecting the computer to other types of networks and remote computer systems.

The computer 1500 can be connected to a storage device 1518 that provides non-volatile storage for the computer. The storage device 1518 can store an operating system 1520, programs 1522, and data, which have been described in greater detail herein. The storage device 1518 can be connected to the computer 1500 through a storage controller 1514 connected to the chipset 1506. The storage device 1518 can consist of one or more physical storage units. The storage controller 1514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1500 can store data on the storage device 1518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1518 is characterized as primary or secondary storage, and the like.

For example, the computer 1500 can store information to the storage device 1518 by issuing instructions through the storage controller 1514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1500 can further read information from the storage device 1518 by detecting the physical states or characteristics of one or more particular locations within the physical storage units.

In addition to the mass storage device 1518 described above, the computer 1500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1500. In some examples, the operations performed by the user device 106, the network controller 118, and or any components included therein, may be supported by one or more devices similar to computer 1500. Stated otherwise, some or all of the operations performed by user device 106 and/or network controller 118, and or any components included therein, may be performed by one or more computer devices 1500.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1518 can store an operating system 1520 utilized to control the operation of the computer 1500. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 1518 can store other system or application programs and data utilized by the computer 1500.

In one embodiment, the storage device 1518 or other computer-readable storage media is encoded with computer-executable instructions which, when loaded into the computer 1500, transform the computer from a general-purpose computing system into a special-purpose computer capable of implementing the embodiments described herein. These computer-executable instructions transform the computer 1500 by specifying how the CPUs 1504 transition between states, as described above. According to one embodiment, the computer 1500 has access to computer-readable storage media storing computer-executable instructions which, when executed by the computer 1500, perform the various processes described above with regard to FIGS. 1-14. The computer 1500 can also include computer-readable storage media having instructions stored thereupon for performing any of the other computer-implemented operations described herein.

The computer 1500 can also include one or more input/output controllers 1516 for receiving and processing input from a number of input devices, such as a keyboard, a mouse, a touchpad, a touch screen, an electronic stylus, or other type of input device. Similarly, an input/output controller 1516 can provide output to a display, such as a computer monitor, a flat-panel display, a digital projector, a printer, or other type of output device. It will be appreciated that the computer 1500 might not include all of the components shown in FIGS. 2 and/or 3, can include other components that are not explicitly shown in FIG. 15, or might utilize an architecture completely different than that shown in FIG. 15.

As described herein, the computer 1500 may comprise one or more of a user device 106, a network controller 118, and/or any other device. The computer 1500 may include one or more hardware processors 1504 (processors) configured to execute one or more stored instructions. The processor(s) 1504 may comprise one or more cores. Further, the computer 1500 may include one or more network interfaces configured to provide communications between the computer 1500 and other devices, such as the communications described herein as being performed by the user device 106 or network controller 118. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 1522 may comprise any type of programs or processes to perform the techniques described in this disclosure for generating code 120 representing an overall network behavior description using a DSL and/or deploying the code 120 to optimized network components.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for using a domain-specific language (DSL) to define an overall network behavior of a network architecture, the method comprising:
   receiving first code, expressed in the DSL, that defines the overall network behavior for the network architecture, the DSL being a network description language usable to define end-to-end network behaviors for network architectures;
   compiling the first code into second code that is executable by a plurality of network devices to perform one or more network functions;
   identifying a first portion of the second code corresponding to a first network function used to implement the overall network behavior;
   identifying a second portion of the second code corresponding to a second network function used to implement the overall network behavior;
   identifying a first network device as being optimized to perform the first network function;
   identifying a second network device as being optimized to perform the second network function;
   deploying the first portion of the second code to the first network device; and
   deploying the second portion of the second code to the second network device.

2. The method of claim 1, further comprising:
   obtaining inventory data indicating device types of the network devices in the network architecture,
   wherein identifying the first network device as being optimized to perform the first network function includes determining, using the inventory data, that the first network device is of a particular device type that is optimized to perform the first network function.

3. The method of claim 1, further comprising:
   obtaining topology data indicating a topology of the network devices in the network architecture,
   wherein identifying the first network device as being optimized to perform the first network function includes determining, using the topology data, that the first network device is at a location in the network optimized to perform the first network function.

4. The method of claim 1, subsequent to compiling the first code into the second code:
   determining multiple combinations of network device types usable to perform the network functions that implement the overall network behavior;
   obtaining inventory data indicating device types of the network devices in the network architecture; and
   determining, using the inventory data, that at least one combination of the multiple combinations of network devices is available in the device types of the network devices in the network architecture.

5. The method of claim 1, wherein:
   the first network device comprises at least one of a router, a network interface card (NIC), a server, a network switch, a virtual machine or a virtual container; and
   the second network device comprises at least a different one of the router, the network interface card (NIC), the server, the network switch, the virtual machine or the virtual container.

6. The method of claim 1, further comprising:
   determining a first device type of the first network device;
   determining a first type of code that the first device type is configured to execute;
   determining a second device type of the second network device; and
   determining a second type of code that the second device type is configured to execute,
   wherein the first portion of the second code is of the first type of code and the second portion of the second code is of the second type of code.

7. The method of claim 6, wherein the first type of code and the second type of code comprise different ones of at least one of:
   an OpenFlow programming language program;
   a P4 programming language program;
   a Linux Extended Berkeley Packet Filter (eBPF) program;
   a program configured to execute on a smart Network Interface Controller (NIC);
   a hardware description language associated with at least one of a Field-Programmable Gate Array (FPGA) or an Application Specific Integrated Circuit (ASIC); or
   a Vector Packet Processor (VPP) program.

8. The method of claim 1, wherein at least part of the first code is expressed in a general-purpose language.

9. A system comprising:
one or more processors; and
one or more non-transitory computer-readable media storing computer-executable instructions that, when executed by the one or more processors, cause the one or more processors to perform operations comprising:
receiving first code, expressed in a domain-specific language (DSL), that defines an overall network behavior for a network architecture, the DSL being a network description language usable to define end-to-end network behaviors for network architectures;
compiling the first code into second code that is executable by a plurality of network devices to perform one or more network functions;
identifying a first portion of the second code corresponding to a first network function used to implement the overall network behavior;
identifying a second portion of the second code corresponding to a second network function used to implement the overall network behavior;
identifying a first network device as being optimized to perform the first network function;
identifying a second network device as being optimized to perform the second network function;
deploying the first portion of the second code to the first network device; and
deploying the second portion of the second code to the second network device.

10. The system of claim 9, the operations further comprising:
obtaining inventory data indicating device types of the network devices in the network architecture,
wherein identifying the first network device as being optimized to perform the first network function includes determining, using the inventory data, that the first network device is of a particular device type that is optimized to perform the first network function.

11. The system of claim 9, the operations further comprising:
obtaining topology data indicating a topology of the network devices in the network architecture,
wherein identifying the first network device as being optimized to perform the first network function includes determining, using the topology data, that the first network device is at a location in the network optimized to perform the first network function.

12. The system of claim 9, subsequent to compiling the first code into the second code:
determining multiple combinations of network device types usable to perform the network functions that implement the overall network behavior;
obtaining inventory data indicating device types of the network devices in the network architecture; and
determining, using the inventory data, that at least one combination of the multiple combinations of network devices is available in the device types of the network devices in the network architecture.

13. The system of claim 9, wherein:
the first network device comprises at least one of a router, a network interface card (NIC), a server, a network switch, a virtual machine or a virtual container; and
the second network device comprises at least a different one of the router, the network interface card (NIC), the server, the network switch, the virtual machine or the virtual container.

14. The system of claim 9, the operations further comprising:
determining a first device type of the first network device;
determining a first type of code that the first device type is configured to execute;
determining a second device type of the second network device; and
determining a second type of code that the second device type is configured to execute,
wherein the first portion of the second code is of the first type of code and the second portion of the second code is of the second type of code.

15. The system of claim 14, wherein the first type of code and the second type of code comprise different ones of at least one of:
an OpenFlow programming language program;
a P4 programming language program;
a Linux Extended Berkeley Packet Filter (eBPF) program;
a program configured to execute on a smart Network Interface Controller (NIC);
a hardware description language associated with at least one of a Field-Programmable Gate Array (FPGA) or an Application Specific Integrated Circuit (ASIC); or
a Vector Packet Processor (VPP) program.

16. One or more non-transitory computer-readable media storing computer-executable instructions that, when executed by one or more processors, cause the one or more processors to perform operations comprising:
receiving first code, expressed in a domain-specific language (DSL), that defines an overall network behavior for a network architecture, the DSL being a network description language usable to define end-to-end network behaviors for network architectures;
compiling the first code into second code that is executable by a plurality of network devices to perform one or more network functions;
identifying a first portion of the second code corresponding to a first network function used to implement the overall network behavior;
identifying a second portion of the second code corresponding to a second network function used to implement the overall network behavior;
identifying a first network device as being optimized to perform the first network function;
identifying a second network device as being optimized to perform the second network function;
deploying the first portion of the second code to the first network device; and
deploying the second portion of the second code to the second network device.

17. The one or more non-transitory computer-readable media of claim 16, the operations further comprising:
obtaining inventory data indicating device types of the network devices in the network architecture,
wherein identifying the first network device as being optimized to perform the first network function includes determining, using the inventory data, that the first network device is of a particular device type that is optimized to perform the first network function.

18. The one or more non-transitory computer-readable media of claim 16, the operations further comprising:
obtaining topology data indicating a topology of the network devices in the network architecture,
wherein identifying the first network device as being optimized to perform the first network function includes determining, using the topology data, that the first network device is at a location in the network optimized to perform the first network function.

19. The one or more non-transitory computer-readable media of claim 16, subsequent to compiling the first code into the second code:
   determining multiple combinations of network device types usable to perform the network functions that implement the overall network behavior;
   obtaining inventory data indicating device types of the network devices in the network architecture; and
   determining, using the inventory data, that at least one combination of the multiple combinations of network devices is available in the device types of the network devices in the network architecture.

20. The one or more non-transitory computer-readable media of claim 16, the operations further comprising:
   determining a first device type of the first network device;
   determining a first type of code that the first device type is configured to execute;
   determining a second device type of the second network device; and
   determining a second type of code that the second device type is configured to execute,
   wherein the first portion of the second code is of the first type of code and the second portion of the second code is of the second type of code.

* * * * *